(12) United States Patent
Hirasawa et al.

(10) Patent No.: US 11,195,662 B2
(45) Date of Patent: Dec. 7, 2021

(54) FILM CAPACITOR WITH A FILM WINDING CORE HAVING METALLIKON ELECTRODES AND BUSBARS ON ITS ENDS

(71) Applicant: DENSO CORPORATION, Kariya (JP)

(72) Inventors: Naoki Hirasawa, Nisshin (JP); Kosuke Kamiya, Kariya (JP); Keishiro Mori, Kariya (JP); Makoto Terawaki, Kariya (JP); Yukikatsu Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 193 days.

(21) Appl. No.: 16/030,526

(22) Filed: Jul. 9, 2018

(65) Prior Publication Data

US 2019/0019625 A1   Jan. 17, 2019

(30) Foreign Application Priority Data

Jul. 14, 2017   (JP) .............. JP2017-138470

(51) Int. Cl.
*H01G 4/32* (2006.01)
*H01G 4/232* (2006.01)
*H01G 4/012* (2006.01)
*H01G 4/015* (2006.01)

(52) U.S. Cl.
CPC .............. *H01G 4/32* (2013.01); *H01G 4/012* (2013.01); *H01G 4/015* (2013.01); *H01G 4/232* (2013.01)

(58) Field of Classification Search
CPC .......... H01G 4/32; H01G 4/012; H01G 4/015; H01G 4/232
See application file for complete search history.

(56) References Cited

U.S. PATENT DOCUMENTS

| 7,002,789 B1* | 2/2006 | Georgopoulos | H01G 2/04 29/25.41 |
| 2005/0263845 A1* | 12/2005 | Saito | H01G 2/10 257/516 |
| 2008/0310075 A1* | 12/2008 | Takeoka | H01G 4/01 361/301.5 |

(Continued)

FOREIGN PATENT DOCUMENTS

| DE | 1118886 B | * 12/1961 | ............... H01G 4/32 |
| DE | 3120298 A1 | * 12/1982 | ............. H01G 4/248 |
| GB | 840059 A | * 7/1960 | ............... H01G 4/32 |

(Continued)

*Primary Examiner* — David M Sinclair
(74) *Attorney, Agent, or Firm* — Oliff PLC

(57) ABSTRACT

A film capacitor includes: a film winding portion formed by winding at least one metalized film that includes a dielectric film and a metal film provided on a surface of the dielectric film; a pair of metallikon electrodes formed respectively on end faces of the film winding portion in a winding axis direction of the film winding portion; and a pair of busbars each of which is joined to a corresponding one of the metallikon electrodes via a joining metal. Each of the busbars is plate-shaped to cover an outer surface of the corresponding metallikon electrode. At least one of the metallikon electrodes has a ridge that is formed on the outer surface of the metallikon electrode to be convex in the winding axis direction toward the corresponding busbar. In the corresponding busbar, there is formed a ridge-receiving portion in which the ridge of the metallikon electrode is received.

28 Claims, 18 Drawing Sheets

(56) References Cited

U.S. PATENT DOCUMENTS

2012/0100761 A1 * 4/2012 Gro e .................. H01M 2/202
439/774

FOREIGN PATENT DOCUMENTS

| JP | S62-166619 U | 10/1987 | |
|----|---|---|---|
| JP | 03095908 A * | 4/1991 | |
| JP | 09082565 A * | 3/1997 | |
| JP | 10247611 A * | 9/1998 | |
| JP | 2000-299245 A | 10/2000 | |
| JP | 2009253251 A * | 10/2009 | ............... H01G 4/32 |
| JP | 2013125910 A * | 6/2013 | |
| JP | 2014157961 A * | 8/2014 | ............ H01G 4/248 |
| JP | 2014-203943 A | 10/2014 | |
| JP | 2016-039233 A | 3/2016 | |

* cited by examiner

FILM CAPACITOR WITH A FILM WINDING CORE HAVING METALLIKON ELECTRODES AND BUSBARS ON ITS ENDS

CROSS-REFERENCE TO RELATED APPLICATION

This application is based on and claims priority from Japanese Patent Application No. 2017-138470 filed on Jul. 14, 2017, the contents of which are hereby incorporated by reference in its entirety into this application.

BACKGROUND

1 Technical Field

The present invention relates to film capacitors and methods of manufacturing the film capacitors.

2 Description of Related Art

There are known film capacitors that are formed by winding a metalized film. For example, Japanese Patent Application Publication No. JP2016039233A discloses a film capacitor that includes a film winding portion, a pair of metallikon electrodes and a pair of plate-shaped busbars. The film winding portion is formed by winding a metalized film around a winding axis. The metallikon electrodes are respectively formed on end faces of the film winding portion in the winding axis direction (i.e., the direction of the winding axis) of the film winding portion. The busbars are respectively arranged on and joined to the metallikon electrodes. In addition, the term "metallikon electrode(s)" used hereinafter denotes electrode(s) formed by metal spraying.

However, the inventors of the present application have found the following problems with the film capacitor disclosed in the above patent document.

In general, it is difficult to form outer surfaces of the metallikon electrodes to be perfectly flat; thus it is difficult to ensure the reliability of connection between the metallikon electrodes and the busbars.

More specifically, in forming the film winding portion by winding the metalized film, when the metalized film is slightly displaced to either side in the winding axis direction, part of an end edge of the metalized film protrudes, in the vicinity of a winding center of the film winding portion, to the side in the winding axis direction. Consequently, due to the protruding part, a ridge is formed on the outer surface of that one of the metallikon electrodes which covers the protruding part.

The ridge may lower the reliability of the joint between that one of the metallikon electrodes which has the ridge formed on the outer surface thereof and the busbar arranged on and joined to the metallikon electrode. That is, it may become difficult to stably arrange the plate-shaped busbar on the outer surface of the metallikon electrode where the ridge is formed.

Moreover, in the film capacitor disclosed in the above patent document, each of the busbars has a protrusion formed to protrude toward the film winding portion (or capacitor element) in the vicinity of the winding center of the film winding portion. Consequently, the ridge formed on the outer surface of the metallikon electrode and the protrusion of the busbar that is arranged on the metallikon electrode may interfere with each other, thereby further lowering the reliability of the joint between the metallikon electrode and the busbar.

SUMMARY

According to exemplary embodiments, there is provided a film capacitor which includes: a film winding portion formed by winding at least one metalized film that includes a dielectric film and a metal film provided on a surface of the dielectric film; a pair of metallikon electrodes formed respectively on end faces of the film winding portion in a winding axis direction of the film winding portion; and a pair of busbars each of which is joined to a corresponding one of the metallikon electrodes via a joining metal. Each of the busbars is plate-shaped to cover an outer surface of the corresponding metallikon electrode. At least one of the metallikon electrodes has a ridge that is formed on the outer surface of the metallikon electrode to be convex (or protrude) in the winding axis direction toward the corresponding busbar. In the corresponding busbar, there is formed a ridge-receiving portion in which the ridge of the metallikon electrode is received.

With the above configuration, since there is provided in the corresponding busbar the ridge-receiving portion for receiving the ridge therein, it is possible to stably arrange the corresponding busbar on the outer surface of the metallikon electrode without causing interference between the corresponding busbar and the ridge of the metallikon electrode. As a result, it is possible to reliably join the corresponding busbar to the metallikon electrode via the joining metal, thereby ensuring the reliability of the joint between the metallikon electrode and the corresponding busbar.

According to the exemplary embodiments, there is also provided a method of manufacturing the above film capacitor. The method includes a step of joining each corresponding pair of the metallikon electrodes and the busbars. In the joining step, for each corresponding pair of the metallikon electrodes and the busbars, the joining metal is interposed between the metallikon electrode and the busbar, and then ultrasonic vibration is applied to cause the metallikon electrode and the busbar to vibrate relative to each other, thereby melting the joining metal to form a joint between the metallikon electrode and the busbar.

With the above method, each corresponding pair of the metallikon electrodes and the busbars are joined by ultrasonic vibration via the joining metal. Consequently, it is possible to easily and reliably manufacture the film capacitor.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
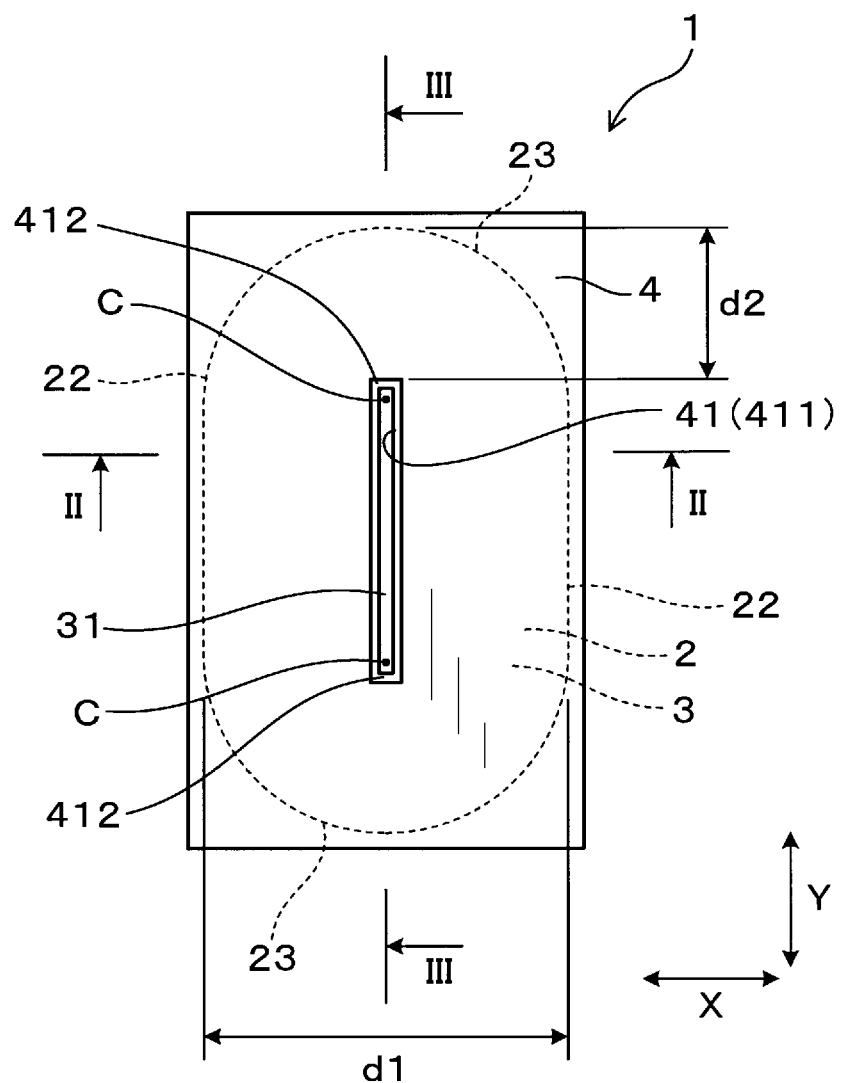
FIG. 1 is a plan view of a film capacitor according to a first embodiment.

Exemplary embodiments will be described hereinafter with reference to FIGS. 1-27. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 2:
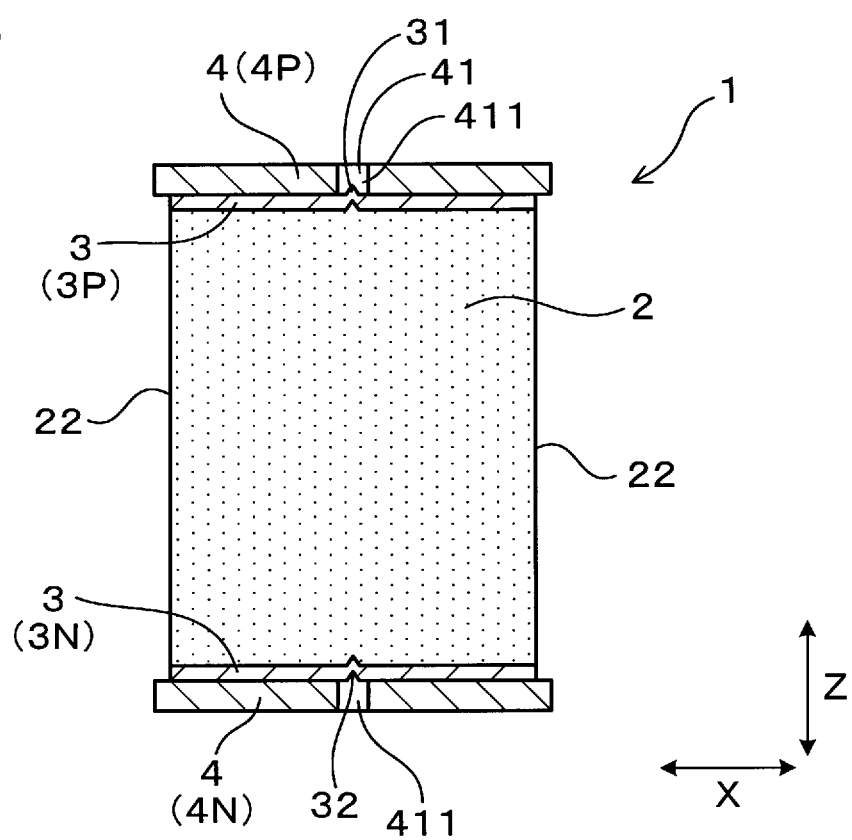
FIG. 2 is a cross-sectional view taken along the line II-II in FIG. 1.
Figure 3:
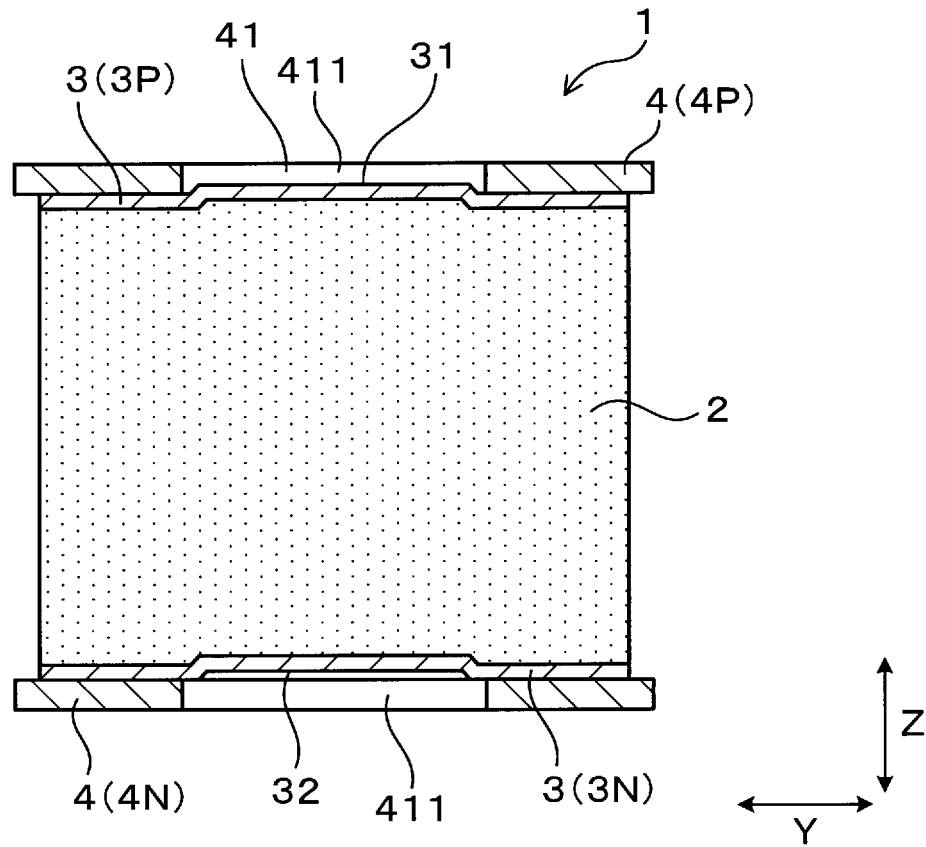
FIG. 3 is a cross-sectional view taken along the line in FIG. 1.

FIGS. 1-3 together show the overall configuration of a film capacitor 1 according to the first embodiment.

As shown in FIGS. 1-3, the film capacitor 1 includes a film winding portion 2, a pair of metallikon electrodes 3 and a pair of busbars 4.

Figure 4:
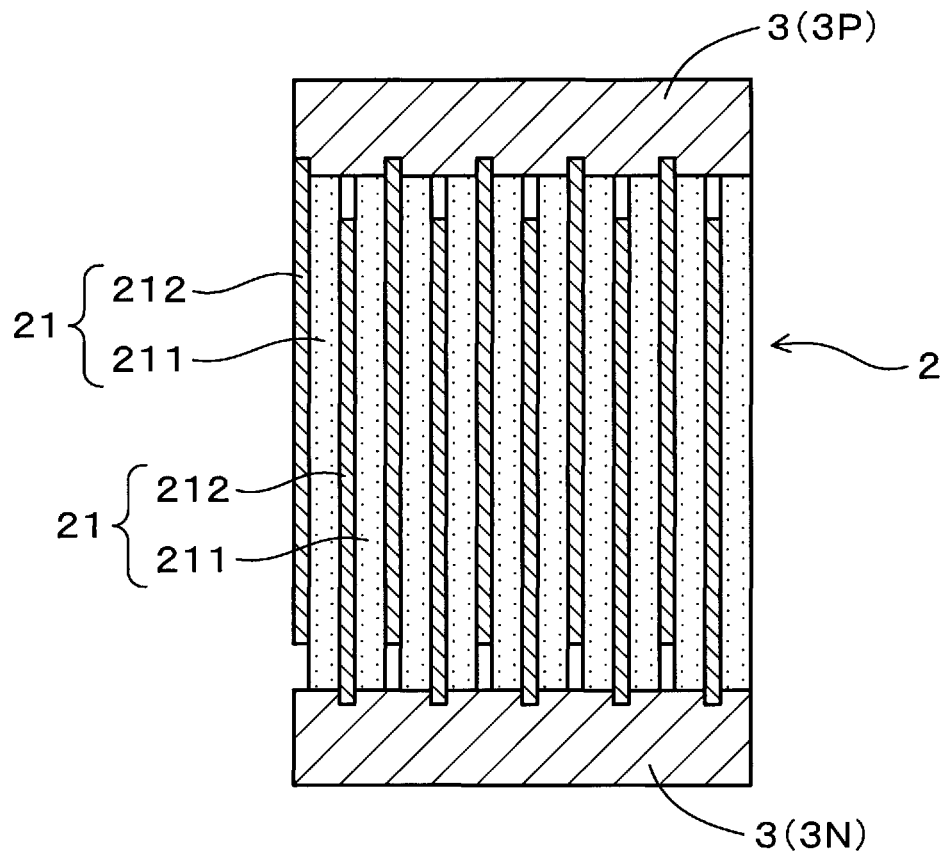
FIG. 4 is a cross-sectional view of a film winding portion and a pair of metallikon electrodes of the film capacitor according to the first embodiment.

As shown in FIG. 4, the film winding portion 2 is formed by winding at least one metalized film 21, more particularly two metalized films 21 in the present embodiment. Each of the metalized films 21 is constituted of a dielectric film 211 and a metal film 212 provided on a surface of the dielectric film 211.

The metallikon electrodes 3 are respectively formed on two end faces of the film winding portion 2 in a winding axis direction (i.e., the direction of a winding axis) Z of the film winding portion 2.

Figure 5:
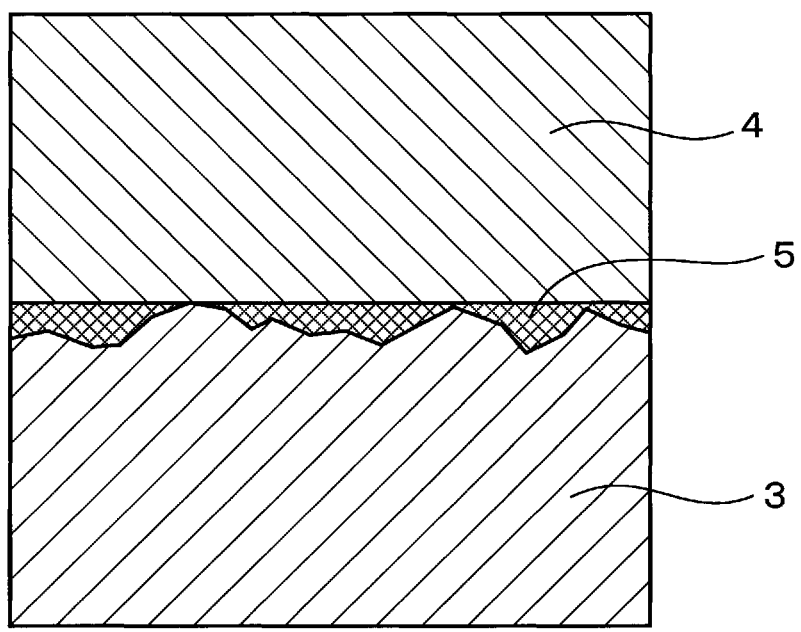
FIG. 5 is an enlarged cross-sectional view illustrating a joint between one of the pair of metallikon electrodes and one of a pair of busbars of the film capacitor according to the first embodiment.

The busbars 4 are respectively joined, via a joining metal 5, to the metallikon electrodes 3 as shown in FIG. 5.

As shown in FIGS. 1-3, the busbars 4 are plate-shaped to respectively cover the metallikon electrodes 3.

Figure 6:
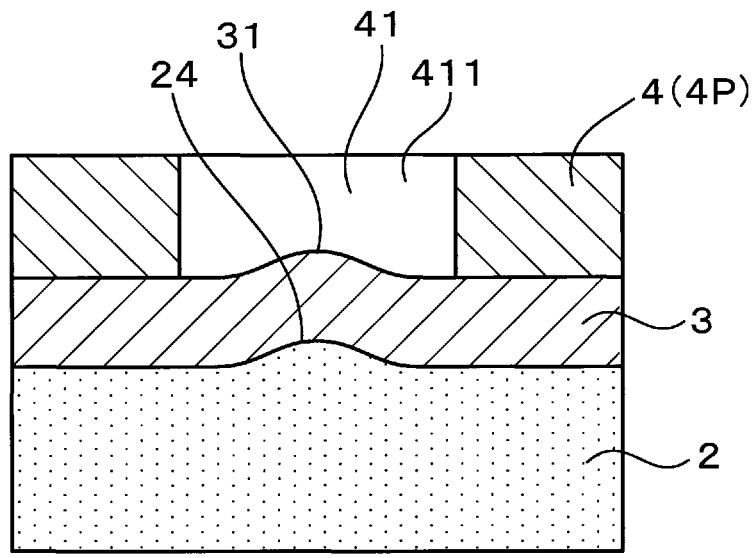
FIG. 6 is a cross-sectional view illustrating both a ridge formed on an outer surface of one of the pair of metallikon electrodes and a ridge-receiving portion formed in one of the pair of busbars in the film capacitor according to the first embodiment.

As shown in FIGS. 2, 3 and 6, at least one of the metallikon electrodes 3, more particularly only one of the metallikon electrodes 3 in the present embodiment has a ridge (or protrusion) 31 formed on an outer surface thereof to be convex (or protrude) in the winding axis direction Z. Moreover, in that one of the busbars 4 which is joined to the metallikon electrode 3 having the ridge 31, there is formed a ridge-receiving portion 41 in which the ridge 31 is received.

In addition, one of the busbars 4 is a positive busbar 4P while the other of the busbars 4 is a negative busbar 4N. Moreover, that one of the metallikon electrodes 3 which is joined to the positive busbar 4P is a positive metallikon electrode 3P, while the other of the metallikon electrodes 3 which is joined to the negative busbar 4N is a negative metallikon electrode 3N.

In the present embodiment, of the pair of metallikon electrodes 3, only the positive metallikon electrode 3P has the ridge 31 formed on the outer surface thereof. Accordingly, of the pair of busbars 4, only the positive busbar 4P has the ridge-receiving portion 41 in which the ridge 31 of the positive metallikon electrode 3P is received.

Figure 8:
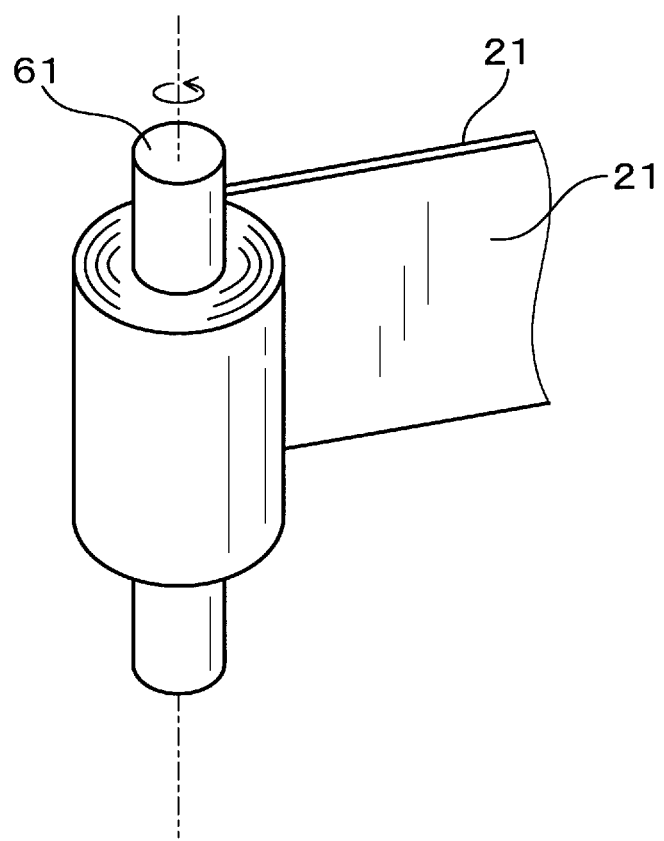
FIG. 8 is a perspective view illustrating a process of forming the film winding portion of the film capacitor according to the first embodiment.
Figure 9A:
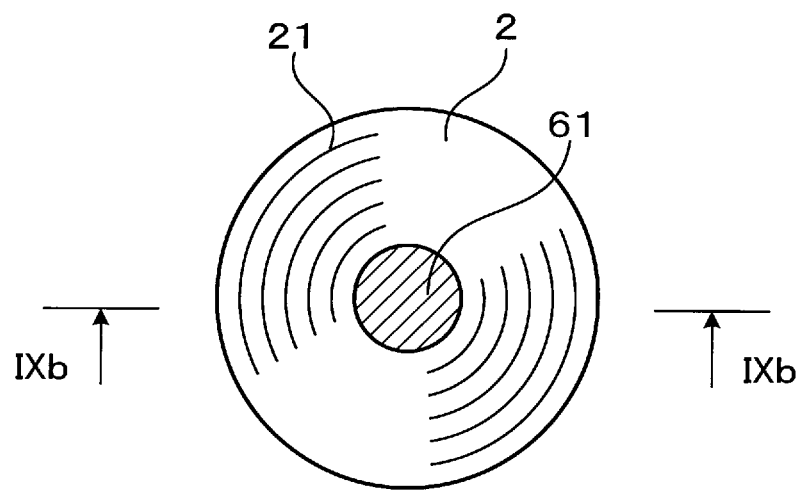
FIG. 9A is a schematic plan view, along a winding axis direction, of the film winding portion of the film capacitor according to the first embodiment in a state of being wound around a metal core.
Figure 9B:
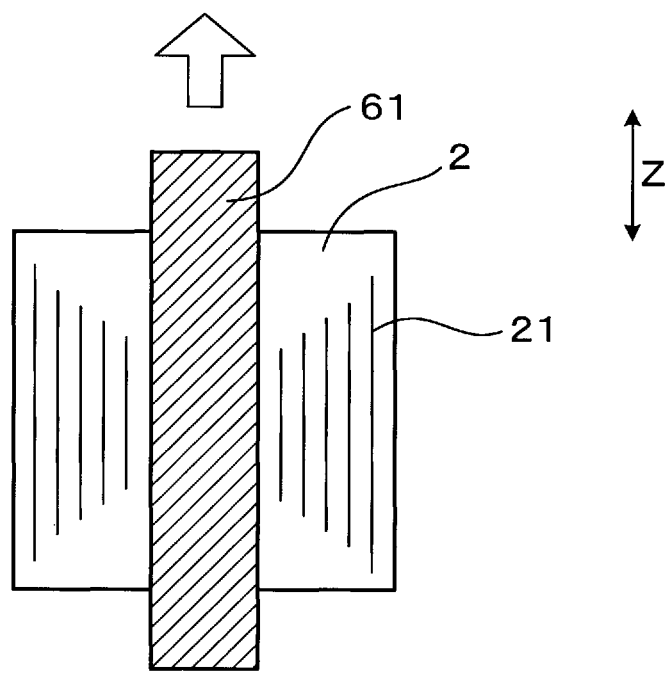
FIG. 9B is a schematic cross-sectional view taken along the line IXb-IXb in FIG. 9A.
Figure 10A:
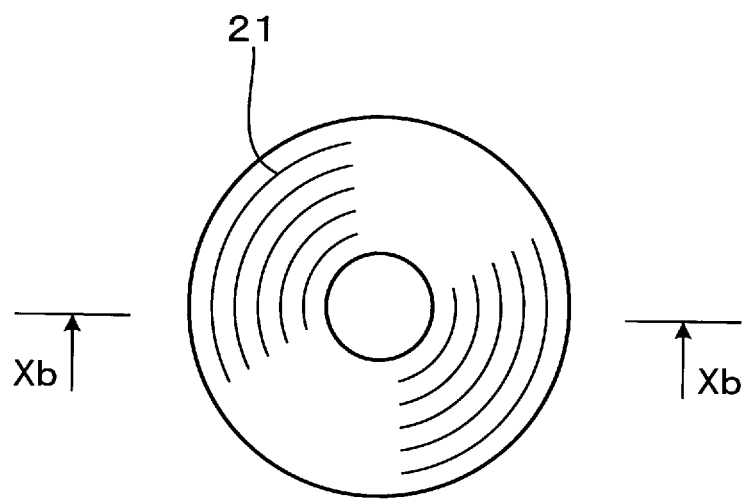
FIG. 10A is a schematic plan view, along the winding axis direction, of the film winding portion of the film capacitor according to the first embodiment after removing the metal core from the film winding portion.
Figure 10B:
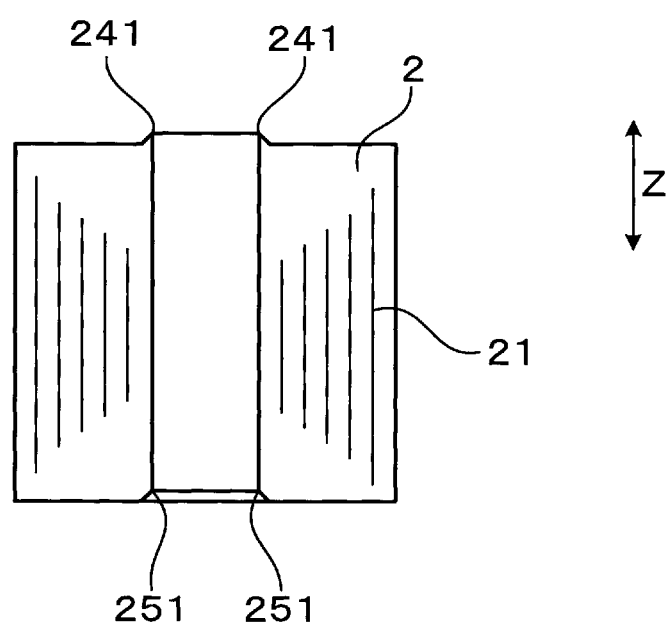
FIG. 10B is a schematic cross-sectional view taken along the line Xb-Xb in FIG. 10A.

Moreover, in the present embodiment, as mentioned previously, the film winding portion 2 is formed of the two metalized films 21 that are superposed and together wound around the winding axis (see FIG. 8). More specifically, as shown in FIG. 4, in each of the metalized films 21, the metal film 212 is provided on only one major surface of the dielectric film 211. The two metalized films 21 are superposed and wound so that the metal films 212 of the metalized films 21 are arranged alternately with the dielectric films 211 of the metalized films 21 in a direction perpendicular to the winding axis direction Z. In addition, the metal film 212 of one of the two metalized films 21 is connected to the positive metallikon electrode 3P while the metal film 212 of the other of the two metalized films 21 is connected to the negative metallikon electrode 3N.

As shown in FIG. 1, the film winding portion 2 has a substantially elliptical shape as viewed along the winding axis direction Z.

The film winding portion 2 has a pair of flat side faces 22 that extend parallel to each other and are spaced from each other in a lateral direction (or width direction) X of the film winding portion 2 which is perpendicular to the winding axis direction Z. When viewed along the winding axis direction Z, the contour (or external shape) of the film winding portion 2 has a shortest dimension in the lateral direction X.

Moreover, as shown in FIG. 1, when viewed along the winding axis direction Z, the ridge-receiving portion 41 of the positive busbar 4P is located equidistant from the pair of flat side faces 22 of the film winding portion 2 in the lateral direction X.

The ridge-receiving portion 41 of the positive busbar 4P is formed to be longer in a longitudinal direction (or length direction) Y of the film winding portion 2 than in the lateral direction X. The longitudinal direction Y is perpendicular to both the lateral direction X and the winding axis direction Z. That is, both the flat side faces 22 of the film winding portion 2 extend parallel to the longitudinal direction Y.

In the present embodiment, the ridge-receiving portion 41 of the positive busbar 4P is formed so that when viewed along the winding axis direction Z, $d2 \leq d1/2$. Here, d1 represents the distance between the pair of flat side faces 22 of the film winding portion 2 in the lateral direction X while d2 represents a distance between the ridge-receiving portion 41 of the positive busbar 4P and the contour of the film winding portion 2 in the longitudinal direction Y The film winding portion 2 also has a pair of curved side faces 23 that are respectively formed on opposite sides of the pair of flat side faces 22 in the longitudinal direction Y and each connect the pair of flat side faces 22. The pair of flat side faces 22 and the pair of curved side faces 23 together constitute a circumferential surface of the film winding portion 2 which extends parallel to the winding axis direction Z.

In the present embodiment, when viewed along the winding axis direction Z, each of the curved side faces 23 of the film winding portion 2 is shaped in a circular arc whose center C is located in the ridge-receiving portion 41 of the positive busbar 4P.

Moreover, as shown in FIG. 1, the circular arc centers C (or the centers C of curvature) of the curved side faces 23 of the film winding portion 2 respectively fall in opposite end parts 412 of the ridge-receiving portion 41 of the positive busbar 4P in the longitudinal direction Y.

In the present embodiment, as shown in FIGS. 2 and 3, each of the pair of busbars 4 has an opening 411 that penetrates the busbar 4 in the winding axis direction Z.

In at least one of the pair of busbars 4, the opening 411 functions as a ridge-receiving portion 41 of the busbar 4 to receive therein the ridge 31 of the metallikon electrode 3 to which the busbar 4 is joined.

More particularly, in the present embodiment, as shown in FIG. 6, the opening 411 formed in the positive busbar 4P functions as the ridge-receiving portion 41 of the positive busbar 4P to receive the ridge 31 of the positive metallikon electrode 3P therein.

Figure 7:
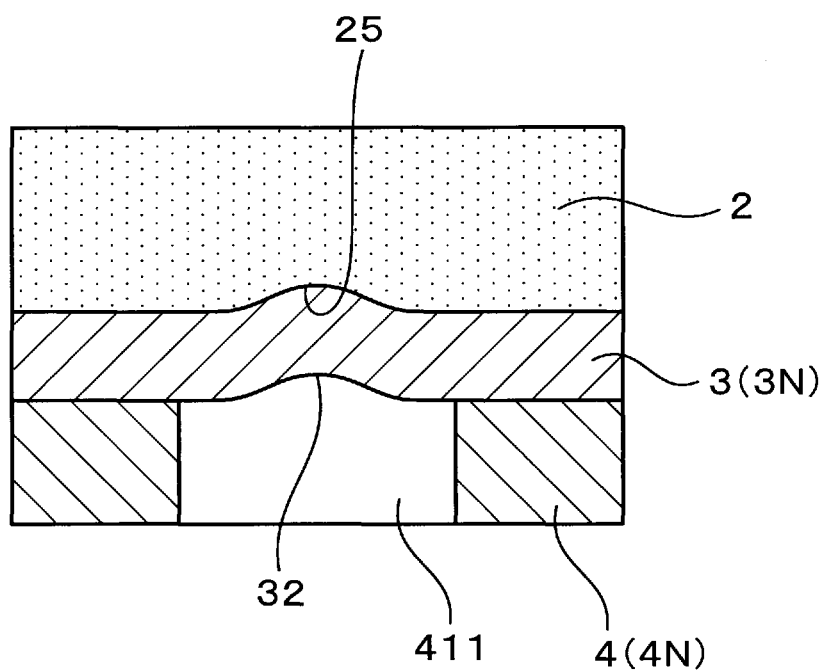
FIG. 7 is a cross-sectional view illustrating both a valley formed in an outer surface of the other metallikon electrode and an opening formed in the other busbar in the film capacitor according to the first embodiment.

On the other hand, as shown in FIGS. 2-3 and 7, the negative metallikon electrode 3N has no ridge 31 formed on the outer surface thereof. Accordingly, no ridge 31 is received in the opening 411 formed in the negative busbar 4N. Therefore, the opening 411 formed in the negative busbar 4N does not function as a ridge-receiving portion 41 of the negative busbar 4N. In addition, as shown in FIG. 7, in the outer surface of the negative metallikon electrode 3N, there is formed a valley (or recess) 32 that is recessed in the winding axis direction Z. When viewed along the winding axis direction Z, the valley 32 of the negative metallikon electrode 3N is located in the opening 411 of the negative busbar 4N.

In the present embodiment, the joining metal 5, via which each corresponding pair of the metallikon electrodes 3 and the busbars 4 are joined, is implemented by solder.

FIG. 5 illustrates one of the metallikon electrodes 3 and one of the busbars 4 which are joined to each other via the solder 5.

As shown in FIG. 5, the outer surface of the metallikon electrode 3 has minute irregularities (i.e., protrusions and recesses). The solder 5 is provided so as to fill the minute recesses in the outer surface of the metallikon electrode 3. In addition, the depths of the minute recesses in the outer surface of the metallikon electrode 3 are considerably less than the thicknesses of the metallikon electrode 3 and the busbar 4.

The solder 5 is arranged over substantially the entire outer surface of the metallikon electrode 3. Moreover, the busbar 4 is arranged so as to cover the entire outer surface of the metallikon electrode 3. With the above arrangement, heat generated in the film winding portion 2 can be easily dissipated via the busbar 4. Moreover, it is possible to secure a wide electric current path between the film winding portion 2 and the busbar 4, thereby achieving a reduction in the inductance.

As shown in FIG. 6, the ridge 31 is formed on the outer surface of the positive metallikon electrode 3P due to a protrusion 24 formed on that one of the end faces of the film winding portion 2 which has the positive metallikon electrode 3P arranged thereon. More specifically, during the process of forming the film winding portion 2 which will be described later, the protrusion 24 is formed on part of the end face of the film winding portion 2. Then, the positive metallikon electrode 3P is formed by thermal spraying a metal (e.g., zinc) onto the end face of the film winding portion 2 which has the protrusion 24 formed thereon. Consequently, on the outer surface of the positive metallikon electrode 3P, there is formed the ridge 31 along and above the protrusion 24 formed on the end face of the film winding portion 2.

Next, a method of manufacturing the film capacitor 1 according to the present embodiment will be described with reference to FIGS. 8-15.

The method of manufacturing the film capacitor 1 includes a film winding portion forming step, a metal core removing step, a film winding portion flattening step, an electrode forming step and a joining step.

First, in the film winding portion forming step, as shown in FIG. 8, the two metalized films 21, which are superposed on each other, are spirally wound around a cylindrical meal core 61 by a predetermined number of turns, forming the film winding portion 2 that is substantially cylindrical in shape.

Then, in the metal core removing step, as shown in FIGS. 9A-9B and 10A-10B, the metal core 61 is pulled out from the film winding portion 2, which is formed around the metal core 61, in the winding axis direction Z of the film winding portion 2.

Figure 12:
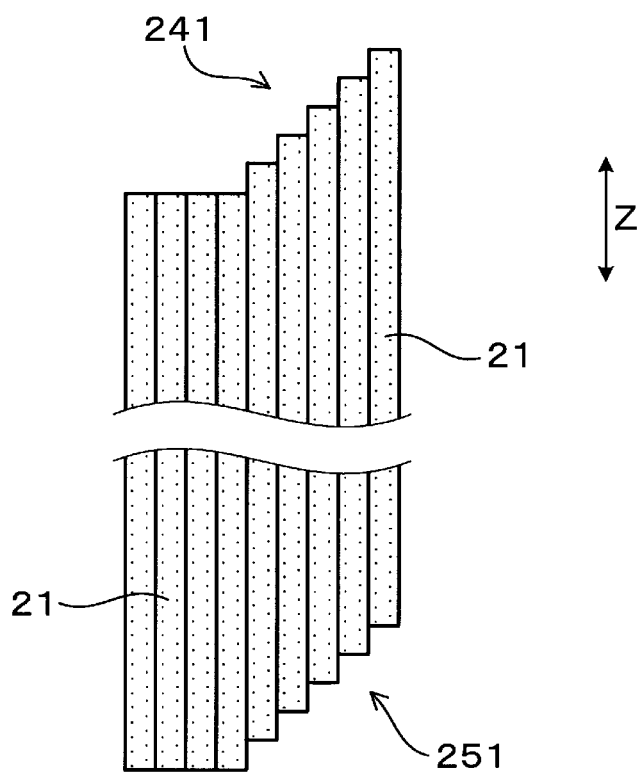
FIG. 12 is a schematic cross-sectional view illustrating metalized films forming the film winding portion of the film capacitor according to the first embodiment in a state of being partially displaced in the winding axis direction.

In this step, with the pulling out of the metal core 61, parts of the metalized films 21 on the winding center side are drawn in the direction of pulling out the metal core 61. Consequently, as shown in FIG. 12, these parts of the metalized films 21 are displaced in the winding axis direction Z. As a result, these parts of the metalized films 21 protrude in the winding axis direction Z from that one of the end faces of the film winding portion 2 from which the metal core 61 is pulled out of the film winding portion 2, forming protruding parts 241 of the metalized films 21. At the same time, these parts of the metalized films 21 retreat in the winding axis direction Z from the other end face of the film winding portion 2, forming retreating parts 251 of the metalized films 21.

Figure 11A:
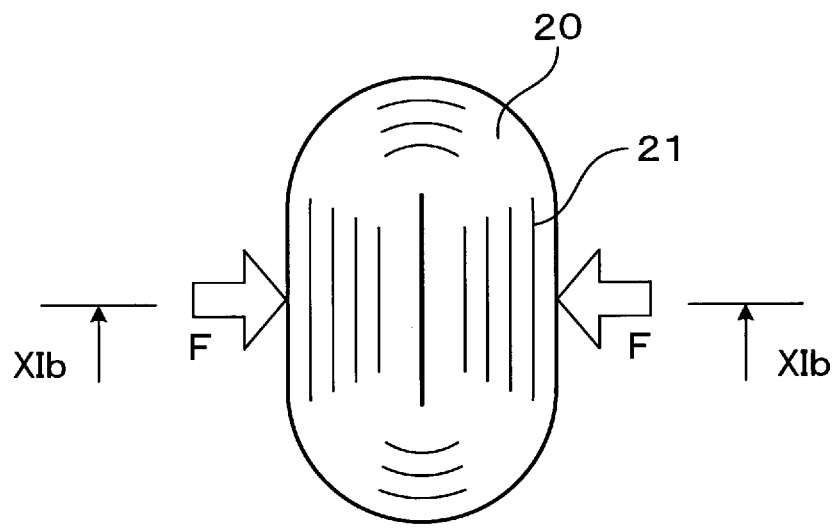
FIG. 11A is a schematic plan view, along the winding axis direction, of the film winding portion of the film capacitor according to the first embodiment after being flattened.
Figure 11B:
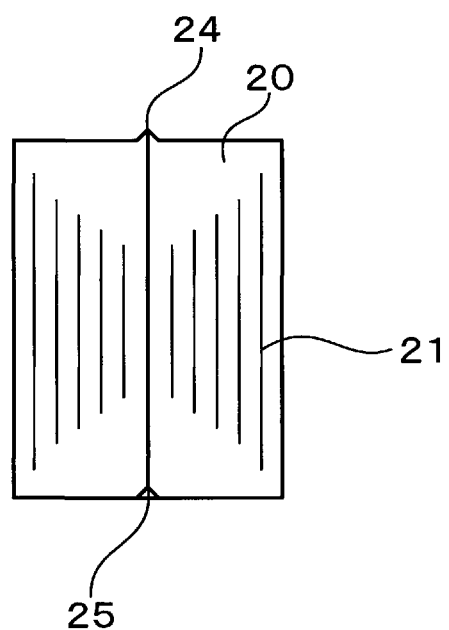
FIG. 11B is a schematic cross-sectional view taken along the line XIb-XIb in FIG. 11A.

In the film winding portion flattening step, as shown in FIGS. 11A-11B, the substantially cylindrical film winding portion 2 (see FIGS. 10A-10B) are flattened by being pressed from both sides in a direction perpendicular to the winding axis direction Z.

Figure 13:
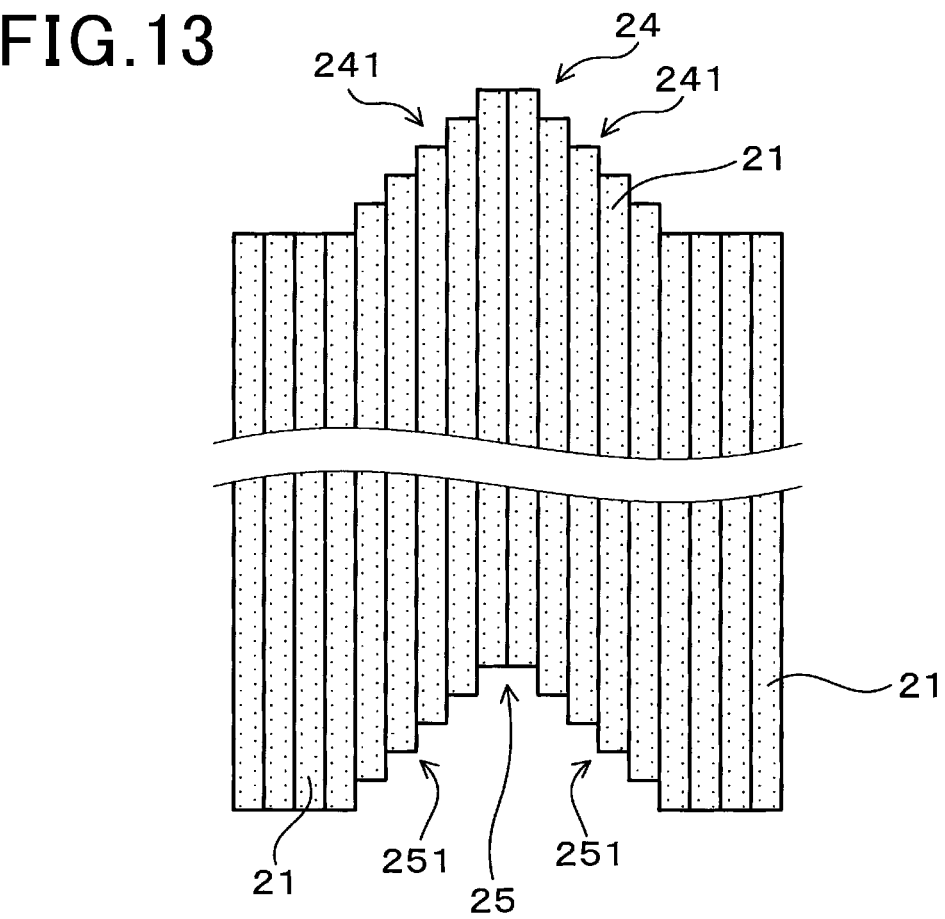
FIG. 13 is a schematic cross-sectional view illustrating the formation of a protrusion and a recess in the film winding portion of the film capacitor according to the first embodiment by the partial displacement of the metalized films in the winding axis direction.

More specifically, in this step, a load F is applied to a radially outer surface of the substantially cylindrical film winding portion 2 from both sides in the direction perpendicular to the winding axis direction Z. Consequently, the film winding portion 2 is flattened to have the substantially elliptical shape as viewed along the winding axis direction Z (see FIG. 11A). As a result, as shown in FIG. 13, all the protruding parts 241 of the metalized films 21 are integrated to form the protrusion 24 on that one of the end faces of the film winding portion 2 from which the metal core 61 is pulled out of the film winding portion 2; all the retreating parts 251 of the metalized films 21 are integrated to form a recess (or groove) 25 in the other end face of the film winding portion 2.

In the electrode forming step, the metallikon electrodes 3 are formed by thermal spraying a metal onto both the end faces of the film winding portion 2.

More specifically, in this step, the metallikon electrodes 3 are formed respectively along the end faces of the film winding portion 2 so that they are substantially flat in shape. However, on the outer surface of the positive metallikon electrode 3P, there is formed the ridge 31 along and above the protrusion 24 formed on one of the end faces of the film winding portion 2 (see FIG. 6). In contrast, in the outer surface of the negative metallikon electrode 3N, there is formed the valley 32 along and above the recess 25 formed in the other of the end faces of the film winding portion 2 (see FIG. 7).

In the joining step, each corresponding pair of the metallikon electrodes 3 and the busbars 4 are joined by ultrasonic vibration welding.

Figure 14:
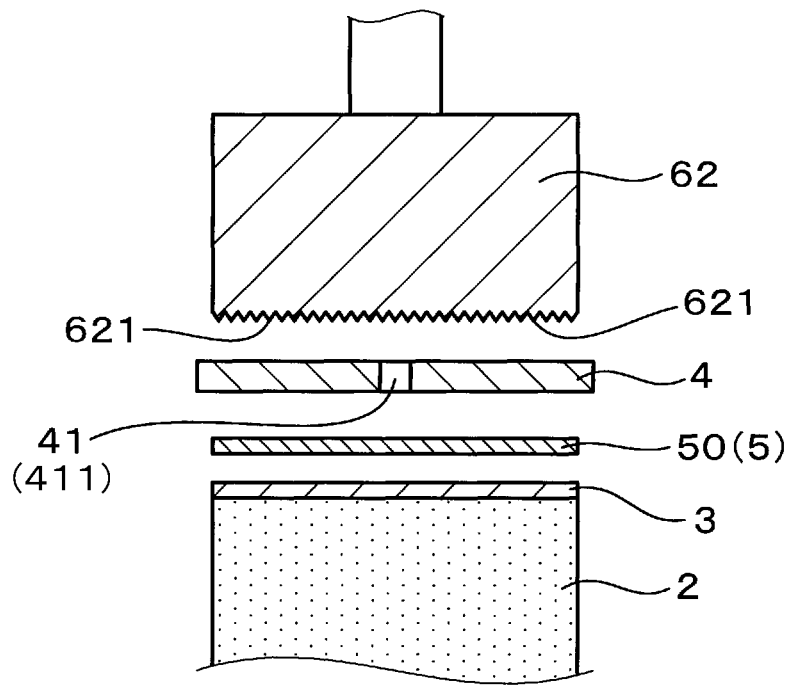
FIG. 14 is a schematic cross-sectional view illustrating the arrangement of an ultrasonic vibrator for joining, by ultrasonic vibration welding, each corresponding pair of the busbars and the metallikon electrodes of the film capacitor according to the first embodiment.
Figure 15:
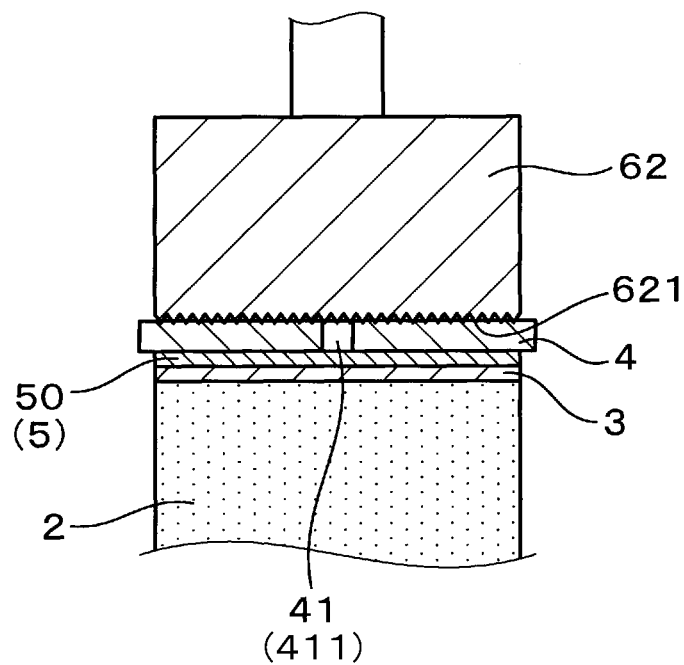
FIG. 15 is a schematic cross-sectional view illustrating a process of joining, by ultrasonic vibration welding, each corresponding pair of the busbars and the metallikon electrodes of the film capacitor according to the first embodiment.

Specifically, in this step, as shown in FIGS. 14-15, for each corresponding pair of the metallikon electrodes 3 and the busbars 4, the joining metal 5 is interposed between the metallikon electrode 3 and the busbar 4. Then, ultrasonic vibration is applied to cause the metallikon electrode 3 and the busbar 4 to vibrate relative to each other, thereby melting the joining metal 5. Consequently, the joining metal 5 forms a weld (or joint) between the metallikon electrode 3 and the busbar 4.

More particularly, in the present embodiment, as shown in FIGS. 14-15, for each corresponding pair of the metallikon electrodes 3 and the busbars 4, a solder foil 50 is interposed between the outer surface of the metallikon electrode 3 and the busbar 4. In addition, in the case of the metallikon electrode 3 having the ridge 31 (not shown in FIGS. 14 and 15) formed on the outer surface thereof, the busbar 4 is arranged so as to allow the ridge 31 of the metallikon electrode 3 to be received in the opening 411 of the busbar 4 which constitutes (i.e., functions as) the ridge-receiving portion 41.

Then, an ultrasonic vibrator 62 is arranged on the outer surface of the busbar 4 on the opposite side to the metallikon electrode 3. The ultrasonic vibrator 62 has a number of needle-like protrusions 621 formed on a contact surface thereof that is placed in contact with the outer surface of the busbar 4.

Thereafter, as shown in FIG. 15, the ultrasonic vibrator 62 presses the busbar 4 against the metallikon electrode 3 via the solder foil 50 while griping the busbar 4. Consequently, the needle-like protrusions 621 of the ultrasonic vibrator 62 slightly bite into the outer surface of the busbar 4. In this state, the ultrasonic vibrator 62 ultrasonically vibrates in a direction along the outer surface of the metallikon electrode 3. Consequently, the solder foil 50 is melted by the frictional heat due to the ultrasonic vibration. Then, the ultrasonic vibration is stopped and thus the molten solder is solidified to adhere to both the metallikon electrode 3 and the busbar 4. As a result, the solidified solder constitutes the joining metal 5 that is interposed between the metallikon electrode 3 and the busbar 4 to join them.

In addition, after the joining step (i.e., after the removable of the ultrasonic vibrator 62 from the busbar 4), on the outer surface of the busbar 4, there remain a number of minute indentations formed by the needle-like protrusions 621 of the ultrasonic vibrator 62.

According to the present embodiment, it is possible to achieve the following advantageous effects.

In the film capacitor 1, at least one of the busbars 4 has the ridge-receiving portion 41 formed therein. More particularly, in the present embodiment, the positive busbar 4P has the ridge-receiving portion 41 formed therein; the ridge 31 formed on the outer surface of the positive metallikon electrode 3P is received in the ridge-receiving portion 41.

With the above configuration, it is possible to stably arrange the positive busbar 4P on the outer surface of the positive metallikon electrode 3P without causing interference between the positive busbar 4P and the ridge 31 formed on the outer surface of the positive metallikon electrode 3P. As a result, it is possible to reliably join the positive busbar 4P to the positive metallikon electrode 3P via the joining metal 5, thereby ensuring the reliability of the joint between the positive metallikon electrode 3P and the positive busbar 4P.

Figure 16:
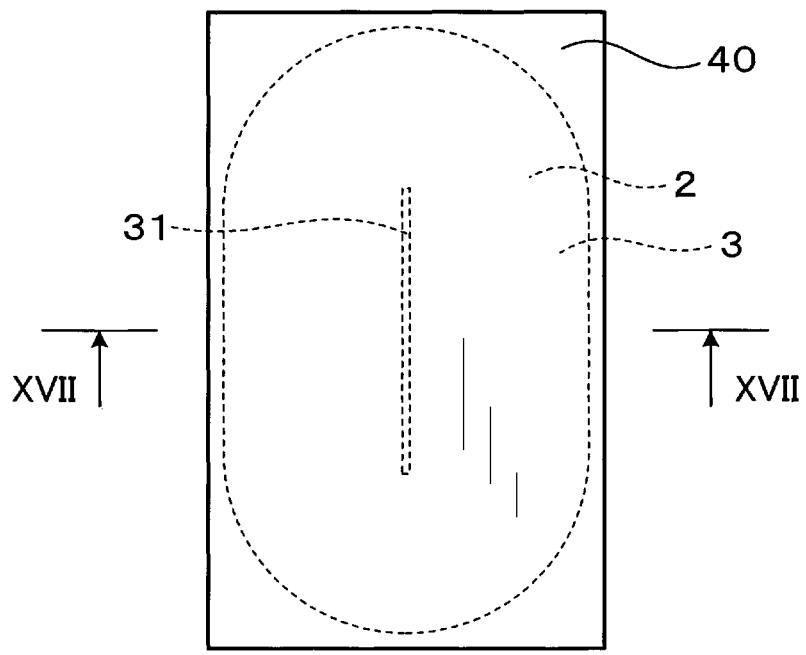
FIG. 16 is a plan view of a film capacitor according to a first comparative example.
Figure 17:
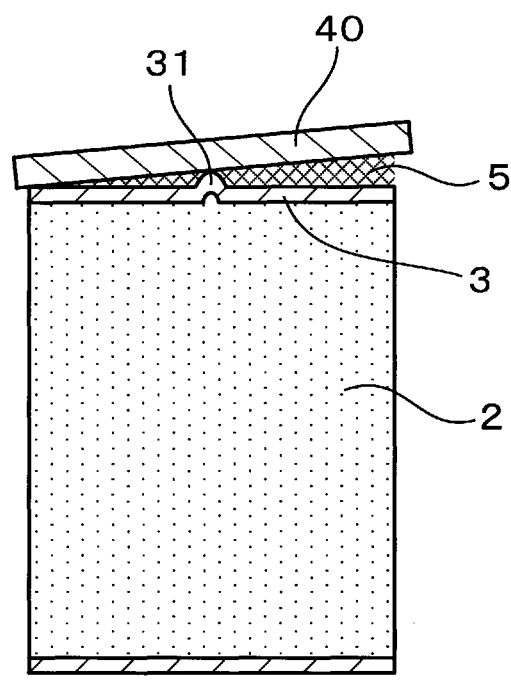
FIG. 17 is a cross-sectional view taken along the line XVII-XVII in FIG. 16.

FIGS. 16 and 17 together show the configuration of a film capacitor according to a first comparative example.

As shown in FIG. 16, in the first comparative example, a plate-shaped busbar 40 has no ridge-receiving portion formed therein. Consequently, as shown in FIG. 17, when the busbar 40 is placed on the outer surface of a metallikon electrode 3 where a ridge 31 is formed, interference would occur between the busbar 40 and the ridge 31 of the metallikon electrode 3, causing the busbar 40 to be inclined to the outer surface of the metallikon electrode 3. As a result, it would be impossible to reliably join the busbar 40 to the metallikon electrode 3 via the joining metal 5.

Figure 18:
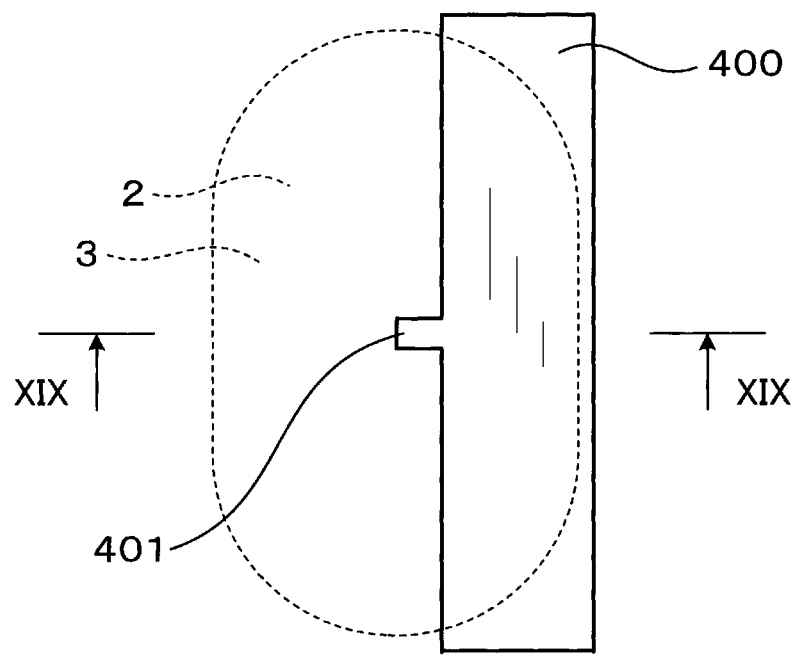
FIG. 18 is a plan view of a film capacitor according to a second comparative example.
Figure 19:
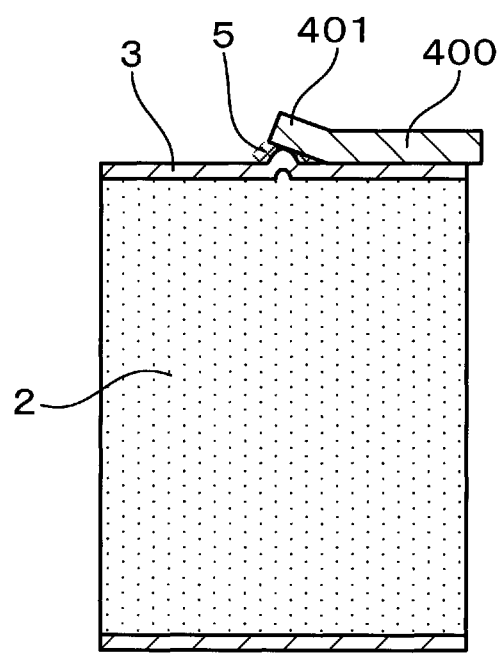
FIG. 19 is a cross-sectional view taken along the line XIX-XIX in FIG. 18.

FIGS. 18 and 19 together show the configuration of a film capacitor according to a second comparative example.

As shown in FIG. 18, in the second comparative example, a busbar 400 has a narrow terminal 401 and is arranged on only part (more specifically, less half) of the outer surface of a metallikon electrode 3. Moreover, as shown in FIG. 19, the terminal 401 of the busbar 400 is joined, via the joining metal 5, to a central area of the outer surface of the metallikon electrode 3 including a ridge formed on the outer surface. In this case, the terminal 401 would be deformed to conform to the shape of the ridge, allowing the busbar 400 to be arranged on the outer surface of the metallikon electrode 3 without being inclined to the outer surface. However, with the above shape and arrangement of the busbar 400, it would be impossible to secure a large opposing area between the outer surface of the metallikon electrode 3 and the busbar 400. As a result, it would be impossible to achieve a reduction in the inductance; it would also be impossible to effectively dissipate heat generated in the film winding portion 2 via the busbar 400.

In comparison, with the above-described configuration of the film capacitor 1 according to the present embodiment, it is possible to ensure the reliability of the joints between the metallikon electrodes 3 and the busbars 4, achieve a reduction in the inductance and effectively dissipate heat generated in the film winding portion 2 via the busbars 4.

Moreover, in the present embodiment, as shown in FIG. 1, the ridge-receiving portion 41 is formed in the positive busbar 4P so that when viewed along the winding axis direction Z, the ridge-receiving portion 41 is equidistant from the pair of flat side faces 22 of the film winding portion 2 in the lateral direction X.

With the above configuration, it is possible to allow the ridge 31 formed on the outer surface of the positive metallikon electrode 3P to be reliably received in the ridge-receiving portion 41 formed in the positive busbar 4P. More specifically, during the manufacture of the film capacitor 1, it is easy for the protrusion 24 of the film winding portion 2, which is the cause of formation of the ridge 31, to be formed equidistant from the pair of flat side faces 22 of the film winding portion 2 in the lateral direction X. Accordingly, it also is easy for the ridge 31 to be formed equidistant from the pair of flat side faces 22 of the film winding portion 2 in the lateral direction X. Consequently, forming the ridge-receiving portion 41 as above, it is possible for the ridge 31 to be reliably received in the ridge-receiving portion 41.

In the present embodiment, the ridge-receiving portion 41 is formed to be longer in the longitudinal direction Y of the film winding portion 2 than in the lateral direction X.

With the above formation, it is possible to allow the ridge 31, which is formed along the longitudinal line Y, to be more reliably received in the ridge-receiving portion 41. Consequently, it is possible to secure a large opposing area between the outer surface of the positive metallikon electrode 3P and the positive busbar 4P while preventing interference between the positive busbar 4P and the ridge 31 formed on the outer surface of the positive metallikon electrode 3P.

In the present embodiment, the ridge-receiving portion 41 is formed so that when viewed along the winding axis direction Z, the following dimensional relationship is satisfied: $d2 \leq d1/2$, where d1 is the distance between the pair of flat side faces 22 of the film winding portion 2 in the lateral direction X, and d2 is the distance between the ridge-receiving portion 41 and the contour of the film winding portion 2 in the longitudinal direction Y.

With the above formation, it is possible to allow the ridge 31 to be more reliably received in the ridge-receiving portion 41. More specifically, during the manufacture of the film capacitor 1, the protrusion 24 of the film winding portion 2, which is the cause of formation of the ridge 31, is formed to have both the ends thereof in the longitudinal direction Y located away from the contour of the film winding portion 2 by d1/2. Accordingly, the ridge 31 is formed to have both the ends thereof in the longitudinal direction Y located away from the contour of the film winding portion 2 by almost d1/2. Consequently, forming the ridge-receiving portion 41 so as to satisfy the dimensional relationship of $d2<d1/2$, it is possible for the ridge 31 to be more reliably received in the ridge-receiving portion 41.

In the present embodiment, when viewed along the winding axis direction Z, each of the curved side faces 23 of the film winding portion 2 is shaped in a circular arc whose center C is located in the ridge-receiving portion 41.

With the above formation, it is possible to allow the ridge 31 to be more reliably received in the ridge-receiving portion 41. More specifically, during the manufacture of the film capacitor 1, it is easy for the protrusion 24 of the film winding portion 2, which is the cause of formation of the ridge 31, to be formed to have both the ends thereof in the longitudinal direction Y located respectively at or close to the circular arc centers C of the curved side faces 23 of the film winding portion 2. Accordingly, it also is easy for the ridge 31 to be formed to have both the ends thereof in the longitudinal direction Y located respectively at or close to the circular arc centers C of the curved side faces 23. Consequently, forming the ridge-receiving portion 41 so as to have the circular arc centers C of the curved side faces 23 located in the ridge-receiving portion 41, it is possible for the ridge 31 to be more reliably received in the ridge-receiving portion 41.

In the present embodiment, when viewed along the winding axis direction Z, the circular arc centers C of the curved side faces 23 respectively fall in the opposite end parts 412 of the ridge-receiving portion 41 in the longitudinal direction Y.

With the above configuration, it is possible to more reliably secure a large opposing area between the outer surface of the positive metallikon electrode 3P and the positive busbar 4P while preventing interference between the positive busbar 4P and the ridge 31 formed on the outer surface of the positive metallikon electrode 3P. More specifically, during the manufacture of the film capacitor 1, it is easy for the protrusion 24 of the film winding portion 2, which is the cause of formation of the ridge 31, to be formed in the shape of a straight line segment connecting the circular arc centers C of the curved side faces 23. Accordingly, it also is easy for the ridge 31 to be formed in the shape of a straight line segment connecting the circular arc centers C of the curved side faces 23. Consequently, forming the ridge-receiving portion 41 so as to have the circular arc centers C of the curved side faces 23 respectively fall in the opposite end parts 412 of the ridge-receiving portion 41, it is possible to minimize the area of the ridge-receiving portion 41 while reliably preventing interference between the positive busbar 4P and the ridge 31 formed on the outer surface of the positive metallikon electrode 3P.

In the present embodiment, the ridge-receiving portion 41 is constituted of the opening 411 that is formed in the positive busbar 4P to penetrate the positive busbar 4P in the winding axis direction Z.

With the above configuration, when the height of the ridge 31 is large, it is still possible to receive the ridge 31 in the ridge-receiving portion 41, preventing interference between the positive busbar 4P and the ridge 31. Moreover, the opening 411 can be formed at the same time as the forming of the contour (or external shape) of the positive busbar 4P, thereby improving the productivity.

In the present embodiment, each of the pair of busbars 4 has the opening 411 that penetrates the busbar 4 in the winding axis direction Z. In at least one of the pair of busbars 4, more particularly in only the positive busbar 4P in the present embodiment, the opening 411 constitutes (or functions as) the ridge-receiving portion 41.

With the above configuration, it is possible to improve the productivity of the film capacitor 1. More specifically, if only one of the pair of busbars 4 had the opening 411 formed therein while the other busbar 4 had neither opening nor recess formed therein, it would be necessary to check, before joining the busbars 4 respectively to the metallikon electrodes 3, whether the busbar 4 having the opening 411 is arranged on the metallikon electrode 3 which has the ridge 31 formed therein. In general, the ridge 31 is very small and thus it needs time and effort to distinguish that one of the metallikon electrodes 3 which has the ridge 31 formed therein from the other metallikon electrode 3 which has no ridge formed therein. In view of the above, in the present embodiment, both the busbars 4 have the respective openings 411 formed therein. Consequently, it becomes possible to omit the aforementioned checking step, thereby improving the productivity of the film capacitor 1.

In the present embodiment, the joining metal 5 is implemented by solder.

With the above configuration, it is possible to suppress the influence of heat, which is generated during the process of joining each corresponding pair of the metallikon electrodes 3 and the busbars 4, on the film winding portion 2. More specifically, during the process of joining each corresponding pair of the metallikon electrodes 3 and the busbars 4 by ultrasonic vibration welding, the temperature at the joint between the metallikon electrode 3 and the busbar 4 is higher than the melting point of the joining metal 5. However, solder, which is employed as the joining metal 5, has a relative low melting point. For example, the melting point of solder is lower than that of an aluminum alloy. Therefore, it is possible to suppress the temperature at the joint between the metallikon electrode 3 and the busbar 4 during the joining process, thereby suppressing the influence of the heat generated during the joining process on the film winding portion 2. Consequently, it is possible to suppress the dielectric films 211 and the metal films 212 of the film winding portion 2 from being changed in properties or being damaged during the joining process.

In particular, by joining each corresponding pair of the metallikon electrodes 3 and the busbars 4 by ultrasonic vibration welding using the solder foil 50, it is possible to effectively suppress the influence of the heat generated during the joining process on the film winding portion 2, thereby ensuring high reliability of the resultant film capacitor 1.

To sum up, the film capacitor 1 according to the present embodiment has high reliability of the joints between the metallikon electrodes 3 and the busbars 4. With the manufacturing method according to the present embodiment, it is possible to easily and reliably manufacture the film capacitor 1.

Second Embodiment

Figure 20:
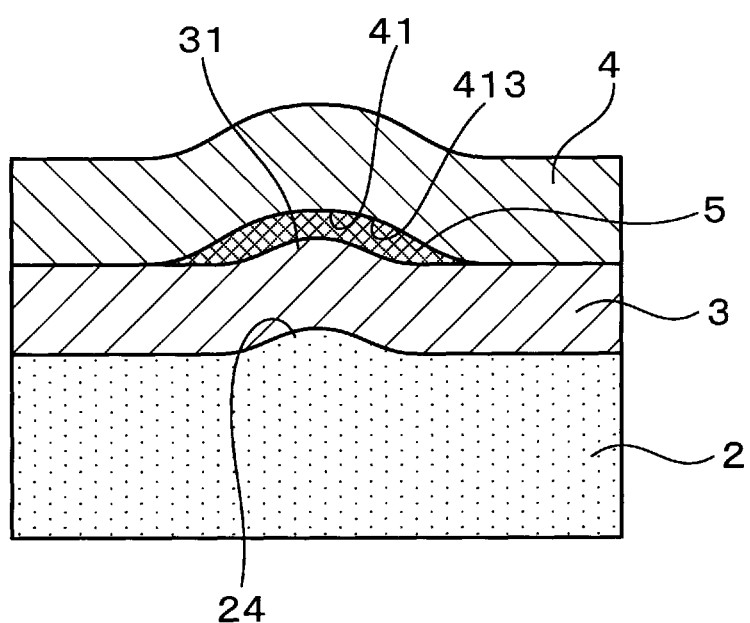
FIG. 20 is a cross-sectional view illustrating both a ridge formed on an outer surface of a metallikon electrode and a ridge-receiving portion formed in a busbar in a film capacitor according to the second embodiment.

In the second embodiment, as shown in FIG. 20, each of the busbars 4 has a recess 413 that is formed in a surface of the busbar 4 facing a corresponding one of the metallikon electrodes 3.

Moreover, as in the first embodiment, one of the metallikon electrodes 3 (i.e., the one shown in FIG. 20) has the ridge 31 formed on the outer surface thereof while the other metallikon electrode 3 (not shown) has no ridge 31 formed on the outer surface thereof. The ridge 31 is received in the recess 413 formed in the corresponding busbar 4. That is, in the present embodiment, the ridge-receiving portion 41 is constituted of the recess 413 formed in the corresponding busbar 4. In addition, the depth of the recess 413 is greater than the height of the ridge 31.

In each of the busbars 4, the recess 413 is formed by locally recessing part of the plate-shaped busbar 4 by, for example, press working. The recess 413 is sized and shaped based on the size and formation region of the ridge 31, so as to be capable of receiving the ridge 31 therein. In addition, as shown in FIG. 20, between the ridge 31 and the wall surface of the recess 413 formed in the corresponding busbar 4, there is interposed the joining metal 5.

Of the pair of metallikon electrodes 3, that metallikon electrode 3 which is not shown in FIG. 20 has no ridge 31 formed on the outer surface thereof, but a valley 32 (see FIG. 7) formed in the outer surface thereof. The valley 32 is opposed to the recess 413 formed in the corresponding busbar 4. However, no part of the metallikon electrode 3 is received in the recess 413 formed in the corresponding busbar 4.

According to the present embodiment, it is possible to achieve the same advantageous effects as described in the first embodiment.

Moreover, in the present embodiment, with the ridge-receiving portion 41 constituted of the recess 413 formed in the corresponding busbar 4, it is possible to increase the opposing area between the metallikon electrode 3 having the ridge 31 and the corresponding busbar 4. Consequently, it is possible to more effectively dissipate heat generated in the film winding portion 2 via the corresponding busbar 4 and more reliably achieve a reduction in the inductance.

Third Embodiment

Figure 21:
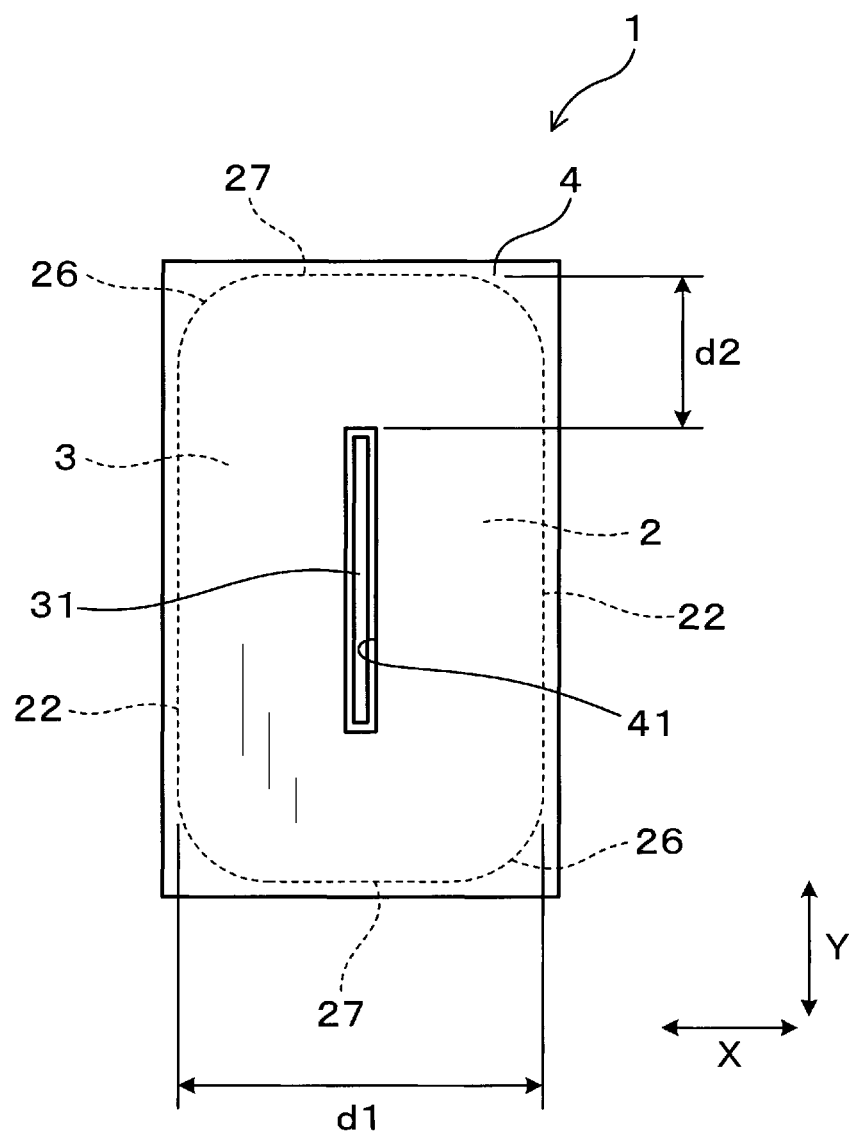
FIG. 21 is a plan view of a film capacitor according to a third embodiment.

In the third embodiment, as shown in FIG. 21, the film winding portion 2 has an external shape (or contour) different from that described in the first embodiment.

Specifically, in the present embodiment, the film winding portion 2 has a pair of flat side faces 22 and a pair of flat side faces 27. The flat side faces 22 extend parallel to each other and are spaced from each other in the lateral direction X of the film winding portion 2. On the other hand, the flat side faces 27 extend parallel to each other and are spaced from each other in the longitudinal direction Y of the film winding portion 2. Moreover, the film winding portion 2 also has four curved corners 26 each of which is formed between one adjacent pair of the flat side faces 22 and 27. That is, in the present embodiment, the film winding portion 2 has a substantially rectangular shape as viewed along the winding axis direction Z.

In the present embodiment, the ridge-receiving portion 41 is formed so that when viewed along the winding axis direction Z, the following dimensional relationship is satisfied: $d2 \leq d1/2$, where d1 is the distance between the pair of flat side faces 22 of the film winding portion 2 in the lateral direction X, and d2 is the distance between the ridge-receiving portion 41 and the contour of the film winding portion 2, i.e., the distance between the ridge-receiving portion 41 and each of the flat side faces 27 in the longitudinal direction Y.

Figure 22:
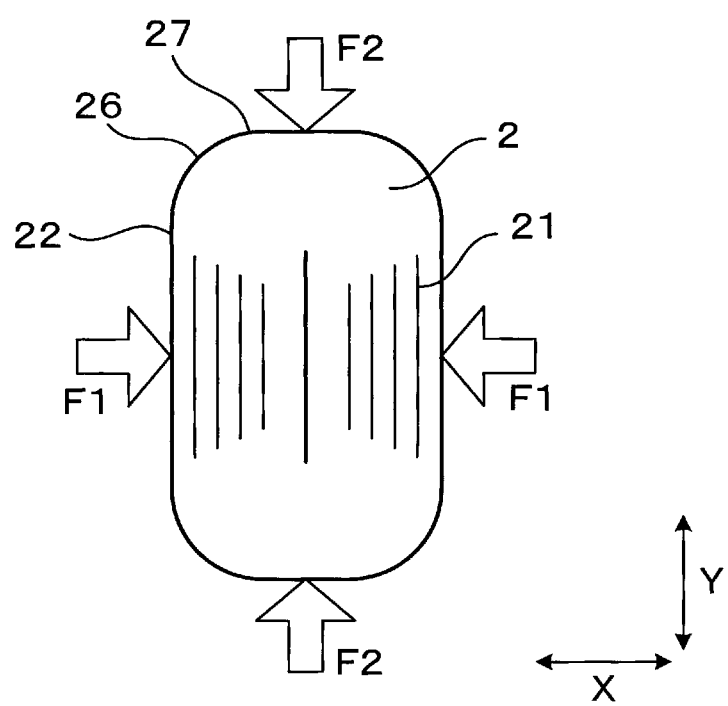
FIG. 22 is a schematic plan view, along a winding axis direction, of a film winding portion of the film capacitor according to the third embodiment after being flattened.

In manufacturing the film capacitor 1 according to the present embodiment, in the flattening step, as shown in FIG. 22, first and second loads F1 and F2 are simultaneously applied to the radially outer surface of the substantially cylindrical film winding portion 2 respectively in first and second directions; the first and second directions are perpendicular to each other and both perpendicular to the winding axis direction Z. More specifically, the first load F1 is applied to the radially outer surface of the substantially cylindrical film winding portion 2 from both sides in the first direction while the second load F2 is applied to the radially outer surface of the substantially cylindrical film winding portion 2 from both sides in the second direction. Consequently, the film winding portion 2 is obtained which has the substantially rectangular shape as viewed along the winding axis direction Z; the lateral and longitudinal directions X and Y of the film winding portion 2 respectively coincide with the first and second directions.

According to the present embodiment, it is possible to achieve the same advantageous effects as described in the first embodiment.

Moreover, in the present embodiment, it is possible to more efficiently utilize the arrangement space of the film winding portion 2. In particular, when a plurality of film winding portions 2 are arranged in parallel with each other, it is possible to improve the arrangement density, thereby saving the arrangement space.

Fourth Embodiment

Figure 23:
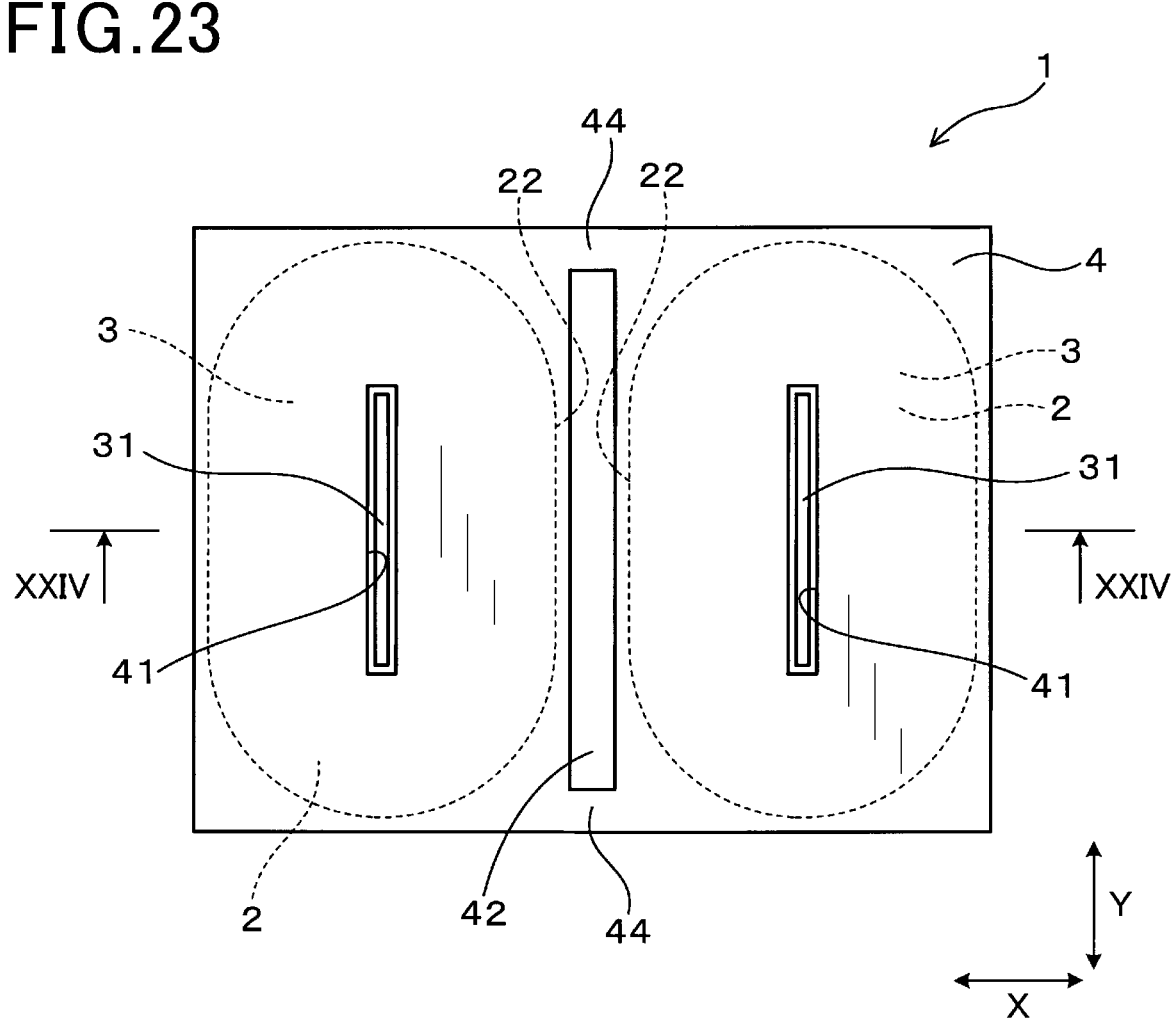
FIG. 23 is a plan view of a film capacitor according to a fourth embodiment.
Figure 24:
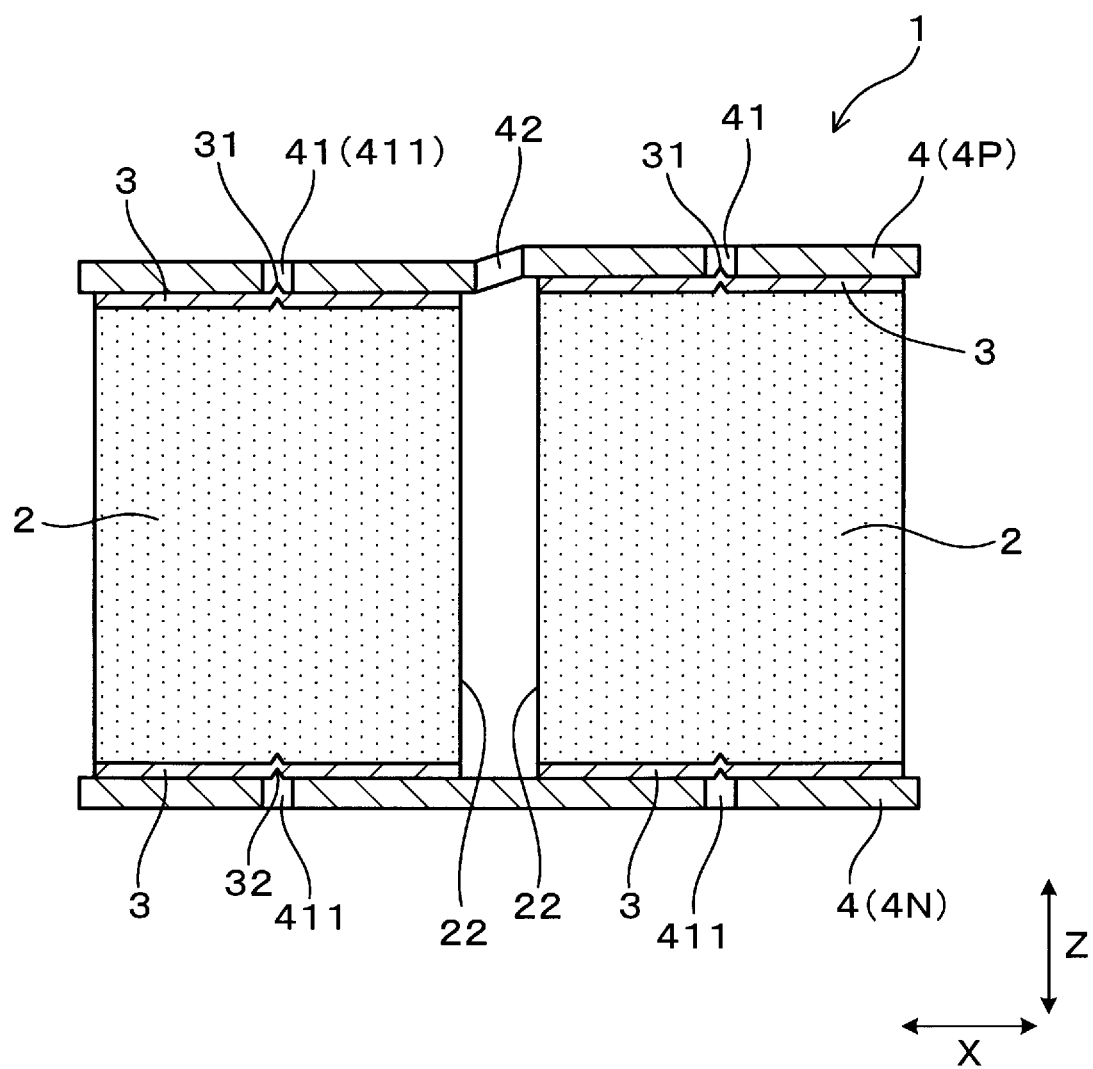
FIG. 24 is a cross-sectional view taken along the line XXIV-XXIV in FIG. 23.

In the fourth embodiment, as shown in FIGS. 23 and 24, between a pair of busbars 4, there are arranged a plurality of film winding portions 2 in parallel with each other.

Specifically, in the present embodiment, two film winding portions 2 are arranged in the lateral direction X so that a pair of the flat side faces 22 of the two film winding portions 2 face each other in the lateral direction X with an air gap formed therebetween.

In the present embodiment, each of the film winding portions 2 has substantially the same configuration as the film winding portion 2 described in the first embodiment; the metallikon electrodes 3 have substantially the same configuration as the metallikon electrodes 3 described in first embodiment. Moreover, the joining structure between the metallikon electrodes 3 and the corresponding busbars 4 is substantially identical to that described in the first embodiment.

However, unlike in the first embodiment, each of the busbars 4 is formed to cover end faces of both the film winding portions 2 in the present embodiment.

Moreover, in the present embodiment, at least one of the busbars 4 has a slit 42 formed to penetrate the busbar 4 in a thickness direction thereof (or in the winding axis direction Z); when viewed along the winding axis direction Z, the slit 42 is located between the two adjacent film winding portions 2 in the lateral direction X (see FIG. 23). More particularly, in the present embodiment, only the positive busbar 4P has the slit 42 formed therein; that is, the negative busbar 4N has no slit 42 formed therein.

In addition, each of the film winding portions 2 can be regarded as a capacitor element. Accordingly, the slit 42 can be referred to as inter-element slit 42.

In the present embodiment, as shown in FIGS. 23 and 24, the slit 42 is formed at a position where it does overlap the film winding portions 2 and the metallikon electrodes 3 in the winding axis direction Z. Moreover, the slit 42 is formed along the longitudinal direction Y of the film winding portions 2. That is, the slit 42 is longer in the longitudinal direction Y than in the lateral direction X of the film winding portions 2.

On both sides of the slit 42 in the longitudinal direction Y, there are respectively formed two connection portions 44 of the positive busbar 4P. Each of the connection portions 44 extends in the lateral direction X to connect two parts of the positive busbar 4P which respectively overlap the two film winding portions 2 in the winding axis direction Z.

According to the present embodiment, it is possible to achieve the same advantageous effects as described in the first embodiment.

Moreover, in the present embodiment, the film capacitor 1 has the two film winding portions 2 connected in parallel with each other between the pair of busbars 4. Therefore, it is possible to efficiently manufacture the film capacitor 1 which has a desired capacitance.

Furthermore, in the present embodiment, the positive busbar 4P has the inter-element slit 42 formed therein. Therefore, it is easy to deform the positive busbar 4P at a position between the two adjacent film winding portions 2. More specifically, with the inter-element slit 42 formed in the positive busbar 4P, it is only necessary to deform the connection portions 44 of the positive busbar 4P. Therefore, compared to the case of the positive busbar 4P having no inter-element slit 42 formed therein, it is easier to deform the positive busbar 4P. Consequently, it becomes easier to absorb, through deformation of the positive busbar 4P, the dimensional differences between the two adjacent film winding portions 2 which are caused by dimensional tolerances in the winding axis direction Z. As a result, it is possible to ensure the reliability of connection between the metallikon electrodes 3 and the busbars 4.

In addition, it should be noted that the film capacitor 1 may be modified to have three or more film winding portions 2 connected in parallel with each other between the pair of busbars 4.

Fifth Embodiment

The fifth embodiment is similar to the fourth embodiment. Therefore, only the differences therebetween will be described hereinafter.

In the fourth embodiment, as described previously, the positive busbar 4P has only the single long inter-element slit 42 formed therein (see FIGS. 23-24).

Figure 25:
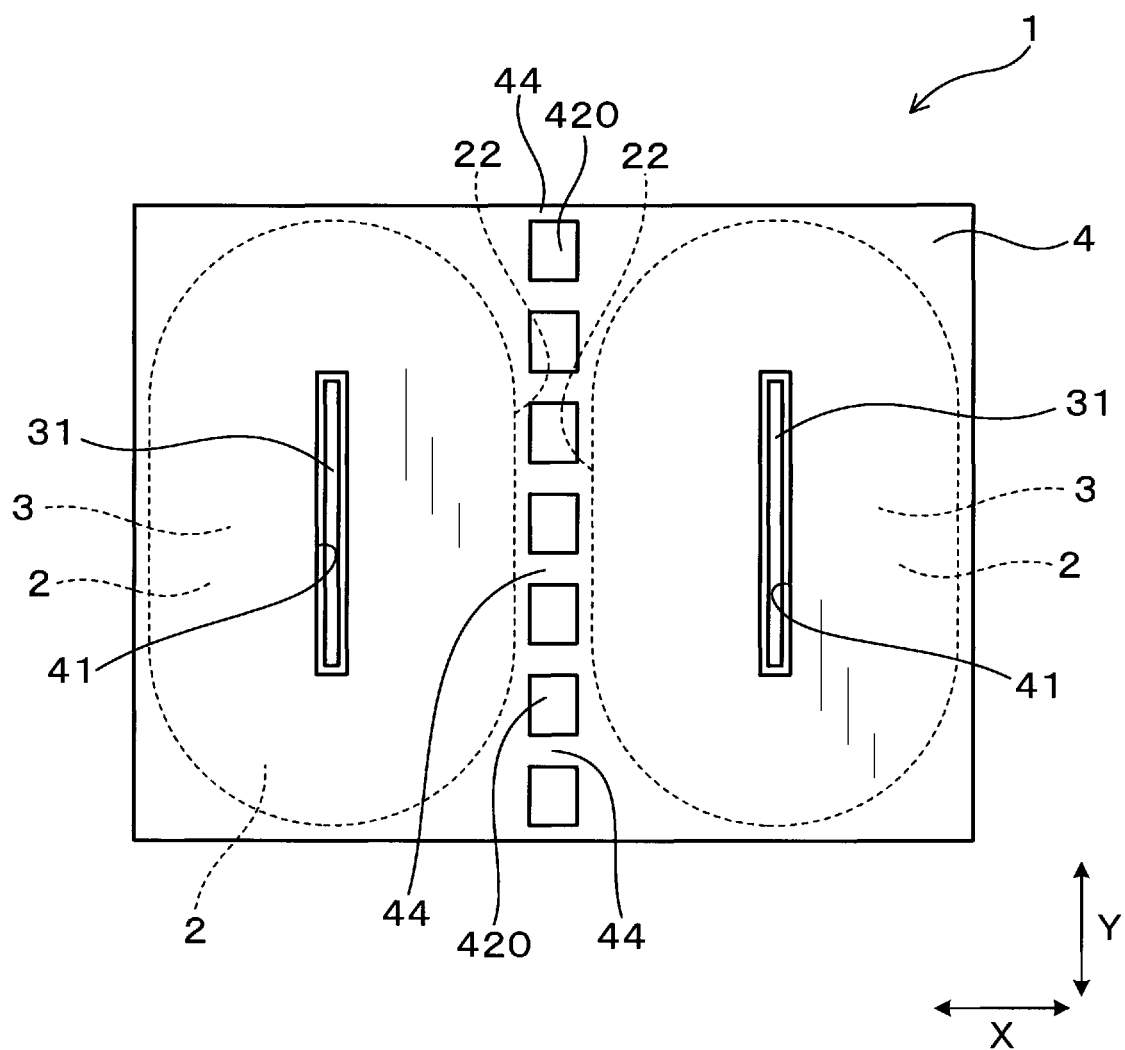
FIG. 25 is a plan view of a film capacitor according to a fifth embodiment.

In comparison, in the present embodiment, as shown in FIG. 25, the positive busbar 4P has a plurality of short inter-element slits 420 formed therein.

Specifically, in the present embodiment, each of the inter-element slits 420 is formed to penetrate the positive busbar 4P in the thickness direction thereof (or in the winding axis direction Z). Moreover, when viewed along the winding axis direction Z, the inter-element slits 420 are aligned and spaced from each other in the longitudinal direction Y of the film winding portions 2; all the inter-element slits 420 are located between the two adjacent film winding portions 2 in the lateral direction X.

On both sides of all the inter-element slits 420 in the longitudinal direction Y, there are respectively formed two connection portions 44 of the positive busbar 4P. Moreover, between each adjacent pair of the inter-element slits 420, there is formed one connection portion 44 of the positive busbar 4P. Each of the connection portions 44 extends in the lateral direction X to connect two parts of the positive busbar 4P which respectively overlap the two film winding portions 2 in the winding axis direction Z.

According to the present embodiment, it is possible to achieve the same advantageous effects as achievable according to the fourth embodiment.

Sixth Embodiment

The sixth embodiment is similar to the fourth embodiment. Therefore, only the differences therebetween will be described hereinafter.

In the fourth embodiment, as described previously, the positive busbar 4P has the inter-element slit 42 formed therein (see FIGS. 23-24).

Figure 26:
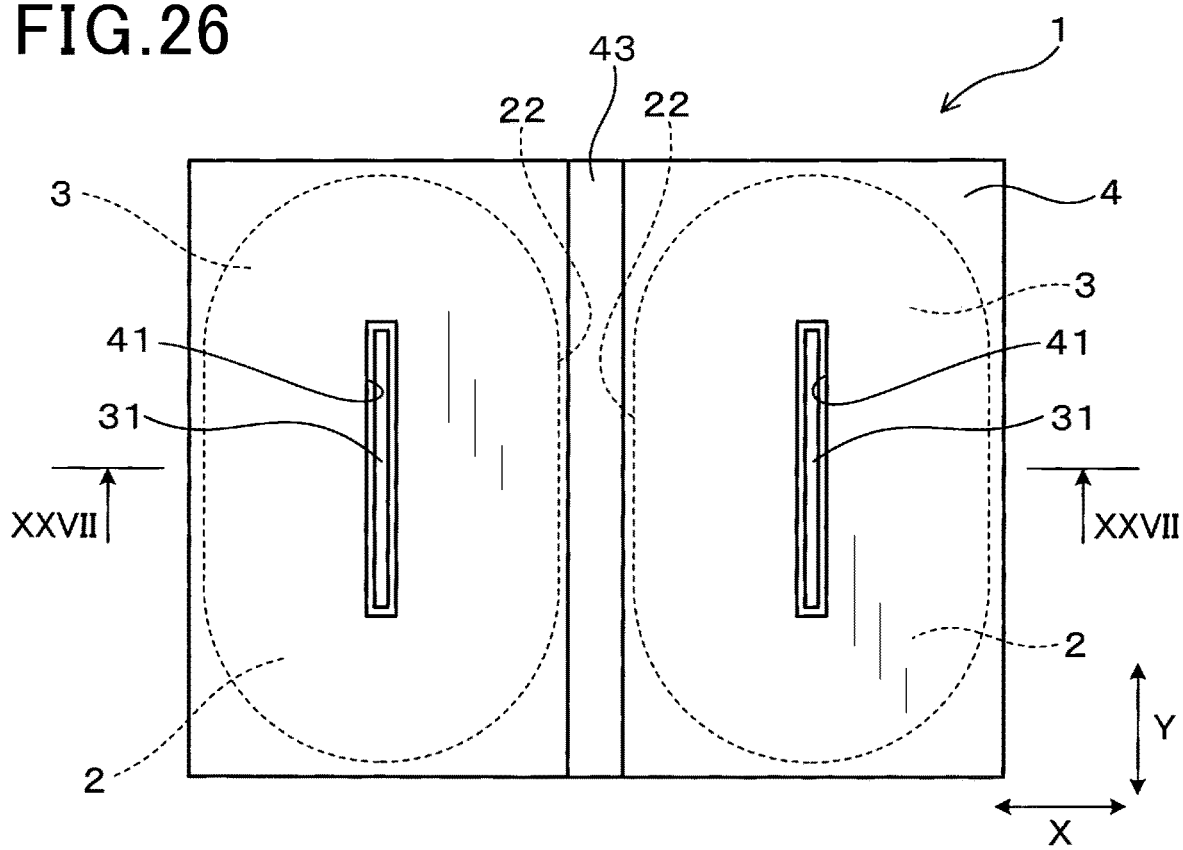
FIG. 26 is a plan view of a film capacitor according to a sixth embodiment.
Figure 27:
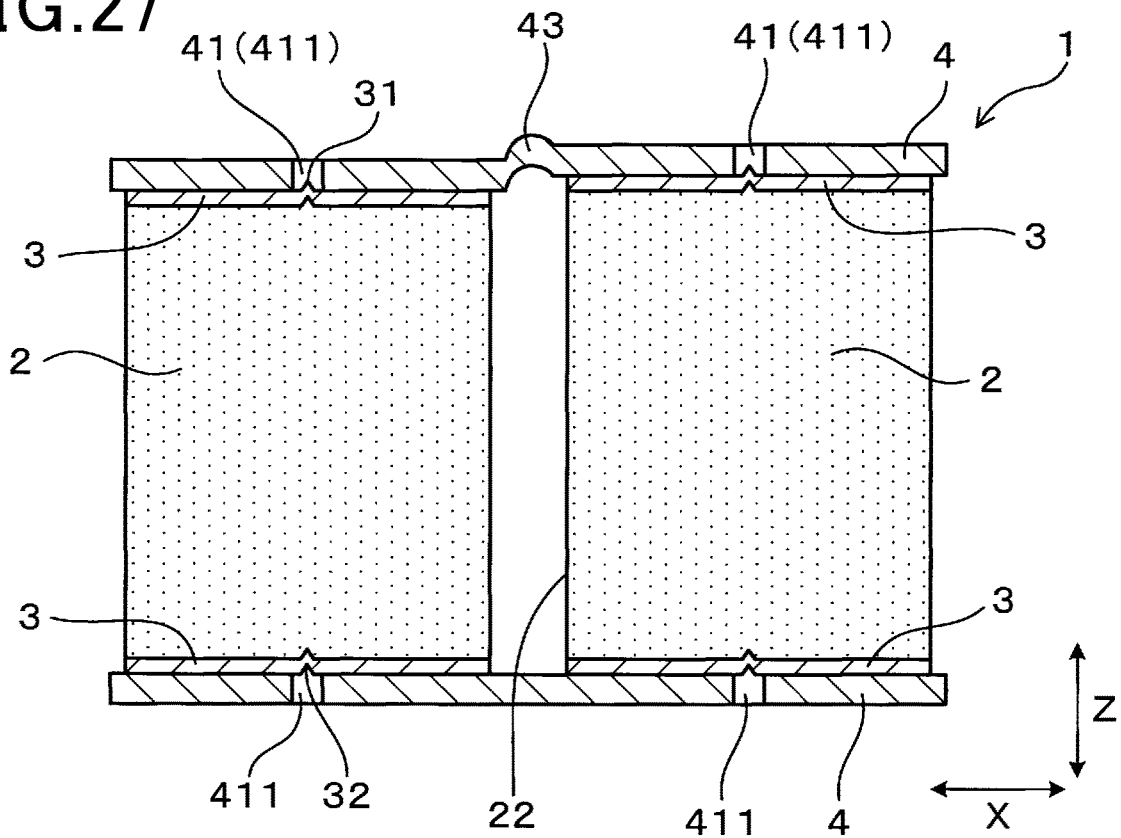
FIG. 27 is a cross-sectional view taken along the line XXVII-XXVII in FIG. 26.

In comparison, in the present embodiment, as shown in FIGS. 26 and 27, the positive busbar 4P has a low-rigidity portion 43 that has a lower rigidity than other portions of the positive busbar 4P adjacent to the low-rigidity portion 43. When viewed along the winding axis direction Z, the low-rigidity portion 43 is located between the two adjacent film winding portions 2 in the lateral direction X.

Specifically, in the present embodiment, the low-rigidity portion 43 is constituted of a bend 43 that is obtained by partially bending the positive busbar 4P. As shown in FIG. 26, the bend 43 is formed in the shape of a straight line in the longitudinal direction Y. Moreover, the bend 43 is formed over the entire length of the positive busbar 4P in the longitudinal direction Y. In addition, as shown in FIG. 27, the shape of a cross section of the bend 43, which is taken along a plane perpendicular to the longitudinal direction Y, is curved.

According to the present embodiment, it is possible to achieve the same advantageous effects as achievable according to the fourth embodiment.

In particular, in the present embodiment, with the bend 43 formed in the positive busbar 4P, it is easy to deform the positive busbar 4P along the formation region of the bend 43. That is, it is easy to deform the positive busbar 4P at a central part of the positive busbar 4P which is located between the two adjacent film winding portions 2 when viewed along the winding axis direction Z. As a result, it is possible to achieve the same advantageous effects as described in the fourth embodiment.

In addition, it should be noted that the low-rigidity portion 43 may alternatively be constituted of, for example, a small-thickness portion of the positive busbar 4P which has a smaller thickness than other portions of the positive busbar 4P adjacent to the small-thickness portion.

While the above particular embodiments have been shown and described, it will be understood by those skilled in the art that various modifications, changes, and improvements may be made without departing from the spirit of the present invention.

For example, in the above-described embodiments, the ridge 31 is formed on the outer surface of the positive metallikon electrode 3P; the ridge-receiving portion 41 is constituted of the opening 411 or the recess 413 formed in the positive busbar 4P. However, the ridge 31 may alternatively be formed on the outer surface of the negative metallikon electrode 3N; the ridge-receiving portion 41 may alternatively be constituted of the opening 411 or the recess 413 formed in the negative busbar 4N.

What is claimed is:

1. A film capacitor comprising:
a film winding portion formed by winding at least one metalized film that includes a dielectric film and a metal film provided on a surface of the dielectric film;
a pair of metallikon electrodes formed respectively on end faces of the film winding portion in a winding axis direction of the film winding portion; and
a pair of busbars each of which is joined to a corresponding one of the metallikon electrodes via a joining metal,
wherein
each of the busbars is plate-shaped to cover an outer surface of the corresponding metallikon electrode,
at least one of the metallikon electrodes has a ridge that is formed on the outer surface of the at least one of the metallikon electrodes to be convex in the winding axis direction toward a corresponding busbar,
in the corresponding busbar, there is formed a ridge-receiving portion in which the ridge of the at least one of the metallikon electrodes is received,
the ridge-receiving portion is an opening through the corresponding busbar in the winding axis direction,
the film winding portion has a pair of flat side faces that extend parallel to each other and are spaced from each other in a lateral direction of the film winding portion, the lateral direction being perpendicular to the winding axis direction,
when viewed along the winding axis direction, a contour of the film winding portion has a shortest dimension in the lateral direction,
the ridge-receiving portion is formed so that when viewed along the winding axis direction, the ridge-receiving portion is equidistant from the pair of flat side faces of the film winding portion in the lateral direction, and
the ridge-receiving portion is formed along a longitudinal direction of the film winding portion, which is perpendicular to both the lateral direction and the winding axis direction, so as to be longer in the longitudinal direction than in the lateral direction.

2. The film capacitor as set forth in claim 1, wherein the each of the busbars has the opening and the ridge is received in at least one of the openings.

3. The film capacitor as set forth in claim 1, wherein between the pair of busbars, there are a plurality of film winding portions as set forth in claim 1 arranged in parallel with each other.

4. The film capacitor as set forth in claim 3, wherein at least one of the busbars has a slit formed to penetrate the at least one of the busbars in a thickness direction thereof, and
when viewed along the winding axis direction, the slit is located between adjacent two of the plurality of film winding portions.

5. The film capacitor as set forth in claim 3, wherein at least one of the busbars has a low-rigidity portion that has a lower rigidity than other portions of the at least one of the busbars adjacent to the low-rigidity portion, and
when viewed along the winding axis direction, the low-rigidity portion is located between adjacent two of the plurality of film winding portions.

6. The film capacitor as set forth in claim 1, wherein the joining metal is solder.

7. A film capacitor comprising:
a film winding portion formed by winding at least one metalized film that includes a dielectric film and a metal film provided on a surface of the dielectric film;
a pair of metallikon electrodes formed respectively on end faces of the film winding portion in a winding axis direction of the film winding portion; and
a pair of busbars each of which is joined to a corresponding one of the metallikon electrodes via a joining metal, wherein
each of the busbars is plate-shaped to cover an outer surface of the corresponding metallikon electrode,
at least one of the metallikon electrodes has a ridge that is formed on the outer surface of the at least one of the metallikon electrodes to be convex in the winding axis direction toward a corresponding busbar,
in the corresponding busbar, there is formed a ridge-receiving portion in which the ridge of the at least one of the metallikon electrodes is received,
the ridge-receiving portion is an opening through the corresponding busbar in the winding axis direction,
the film winding portion has a pair of flat side faces that extend parallel to each other and are spaced from each other in a lateral direction of the film winding portion, the lateral direction being perpendicular to the winding axis direction,
when viewed along the winding axis direction, a contour of the film winding portion has a shortest dimension in the lateral direction,
the ridge-receiving portion is formed so that when viewed along the winding axis direction, the ridge-receiving portion is equidistant from the pair of flat side faces of the film winding portion in the lateral direction, and
the ridge-receiving portion is formed so that when viewed along the winding axis direction, $d2 \leq d1/2$, where d1 is a distance between the pair of flat side faces of the film winding portion in the lateral direction, and d2 is a distance between the ridge-receiving portion and the contour of the film winding portion in the longitudinal direction.

8. The film capacitor as set forth in claim 7, wherein the film winding portion also has a pair of curved side faces that are respectively formed on opposite sides of the pair of flat side faces in the longitudinal direction and each connect the pair of flat side faces, and
when viewed along the winding axis direction, each of the curved side faces of the film winding portion is shaped in a circular arc whose center is located in the ridge-receiving portion.

9. The film capacitor as set forth in claim 8, wherein when viewed along the winding axis direction, the circular arc centers of the curved side faces respectively fall in opposite end parts of the ridge-receiving portion in the longitudinal direction.

10. The film capacitor as set forth in claim 7, wherein the each of the busbars has the opening and the ridge is received in at least one of the openings.

11. The film capacitor as set forth in claim 7, wherein between the pair of busbars, there are a plurality of film winding portions as set forth in claim 1 arranged in parallel with each other.

12. The film capacitor as set forth in claim 11, wherein at least one of the busbars has a slit formed to penetrate the at least one of the busbars in a thickness direction thereof, and
when viewed along the winding axis direction, the slit is located between adjacent two of the plurality of film winding portions.

13. The film capacitor as set forth in claim 11, wherein at least one of the busbars has a low-rigidity portion that has a lower rigidity than other portions of the at least one of the busbars adjacent to the low-rigidity portion, and
when viewed along the winding axis direction, the low-rigidity portion is located between adjacent two of the plurality of film winding portions.

14. The film capacitor as set forth in claim 7, wherein the joining metal is solder.

15. A film capacitor comprising:
a film winding portion formed by winding at least one metalized film that includes a dielectric film and a metal film provided on a surface of the dielectric film;
a pair of metallikon electrodes formed respectively on end faces of the film winding portion in a winding axis direction of the film winding portion; and
a pair of busbars each of which is joined to a corresponding one of the metallikon electrodes via a joining metal, wherein
each of the busbars is plate-shaped to cover an outer surface of the corresponding metallikon electrode,
at least one of the metallikon electrodes has a ridge that is formed on the outer surface of the at least one of the metallikon electrodes to be convex in the winding axis direction toward a corresponding busbar,
in the corresponding busbar, there is formed a ridge-receiving portion in which the ridge of the at least one of the metallikon electrodes is received,
the ridge-receiving portion is a recess that is formed in a surface of the corresponding busbar facing the at least one of the metallikon electrodes,
the joining metal is in the recess,
the film winding portion has a pair of flat side faces that extend parallel to each other and are spaced from each other in a lateral direction of the film winding portion, the lateral direction being perpendicular to the winding axis direction,
when viewed along the winding axis direction, a contour of the film winding portion has a shortest dimension in the lateral direction,
the ridge-receiving portion is formed so that when viewed along the winding axis direction, the ridge-receiving portion is equidistant from the pair of flat side faces of the film winding portion in the lateral direction, and
the ridge-receiving portion is formed along a longitudinal direction of the film winding portion, which is perpendicular to both the lateral direction and the winding axis direction, so as to be longer in the longitudinal direction than in the lateral direction.

16. The film capacitor as set forth in claim 15, wherein the each of the busbars has the recess and the ridge is received in at least one of the recesses.

17. The film capacitor as set forth in claim 15, wherein between the pair of busbars, there are a plurality of film winding portions as set forth in claim 15 arranged in parallel with each other.

18. The film capacitor as set forth in claim 17, wherein at least one of the busbars has a slit formed to penetrate the at least one of the busbars in a thickness direction thereof, and
when viewed along the winding axis direction, the slit is located between adjacent two of the plurality of film winding portions.

19. The film capacitor as set forth in claim 17, wherein at least one of the busbars has a low-rigidity portion that has a lower rigidity than other portions of the at least one of the busbars adjacent to the low-rigidity portion, and when viewed along the winding axis direction, the low-rigidity portion is located between adjacent two of the plurality of film winding portions.

20. The film capacitor as set forth in claim 15, wherein the joining metal is solder.

21. A film capacitor comprising:
a film winding portion formed by winding at least one metalized film that includes a dielectric film and a metal film provided on a surface of the dielectric film;
a pair of metallikon electrodes formed respectively on end faces of the film winding portion in a winding axis direction of the film winding portion; and
a pair of busbars each of which is joined to a corresponding one of the metallikon electrodes via a joining metal, wherein
each of the busbars is plate-shaped to cover an outer surface of the corresponding metallikon electrode,
at least one of the metallikon electrodes has a ridge that is formed on the outer surface of the at least one of the metallikon electrodes to be convex in the winding axis direction toward a corresponding busbar,
in the corresponding busbar, there is formed a ridge-receiving portion in which the ridge of the at least one of the metallikon electrodes is received,
the ridge-receiving portion is a recess that is formed in a surface of the corresponding busbar facing the at least one of the metallikon electrodes,
the joining metal is in the recess,
the film winding portion has a pair of flat side faces that extend parallel to each other and are spaced from each other in a lateral direction of the film winding portion, the lateral direction being perpendicular to the winding axis direction,
when viewed along the winding axis direction, a contour of the film winding portion has a shortest dimension in the lateral direction,
the ridge-receiving portion is formed so that when viewed along the winding axis direction, the ridge-receiving portion is equidistant from the pair of flat side faces of the film winding portion in the lateral direction, and
the ridge-receiving portion is formed so that when viewed along the winding axis direction, $d2 \leq d1/2$, where d1 is a distance between the pair of flat side faces of the film winding portion in the lateral direction, and d2 is a distance between the ridge-receiving portion and the contour of the film winding portion in the longitudinal direction.

22. The film capacitor as set forth in claim 21, wherein the film winding portion also has a pair of curved side faces that are respectively formed on opposite sides of the pair of flat side faces in the longitudinal direction and each connect the pair of flat side faces, and
when viewed along the winding axis direction, each of the curved side faces of the film winding portion is shaped in a circular arc whose center is located in the ridge-receiving portion.

23. The film capacitor as set forth in claim 22, wherein when viewed along the winding axis direction, the circular arc centers of the curved side faces respectively fall in opposite end parts of the ridge-receiving portion in the longitudinal direction.

24. The film capacitor as set forth in claim 21, wherein the each of the busbars has the recess and the ridge is received in at least one of the recesses.

25. The film capacitor as set forth in claim 21, wherein between the pair of busbars, there are a plurality of film winding portions as set forth in claim 21 arranged in parallel with each other.

26. The film capacitor as set forth in claim 25, wherein at least one of the busbars has a slit formed to penetrate the at least one of the busbars in a thickness direction thereof, and
when viewed along the winding axis direction, the slit is located between adjacent two of the plurality of film winding portions.

27. The film capacitor as set forth in claim 25, wherein at least one of the busbars has a low-rigidity portion that has a lower rigidity than other portions of the at least one of the busbars adjacent to the low-rigidity portion, and
when viewed along the winding axis direction, the low-rigidity portion is located between adjacent two of the plurality of film winding portions.

28. The film capacitor as set forth in claim 21, wherein the joining metal is solder.

* * * * *